United States Patent
Skillicorn

(10) Patent No.: US 11,938,579 B2
(45) Date of Patent: Mar. 26, 2024

(54) DRILL PRESS TABLE SYSTEM

(71) Applicant: Woodpeckers, LLC, Strongsville, OH (US)

(72) Inventor: Gregory L. Skillicorn, Akron, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 568 days.

(21) Appl. No.: 17/163,762

(22) Filed: Feb. 1, 2021

(65) Prior Publication Data

US 2022/0241913 A1    Aug. 4, 2022

(51) Int. Cl.
*B23Q 1/26* (2006.01)
*B23Q 1/03* (2006.01)

(52) U.S. Cl.
CPC .............. *B23Q 1/262* (2013.01); *B23Q 1/03* (2013.01)

(58) Field of Classification Search
CPC .............. Y10T 408/50; Y10T 408/561; B23Q 11/0046; B23Q 11/0067; B23Q 11/0042; B23Q 11/0053; B23Q 1/262; B23Q 1/28; B23Q 3/005; B23Q 3/007; B23B 47/00; B23B 47/287; B23B 47/28; B23B 2260/12
See application file for complete search history.

(56) References Cited

U.S. PATENT DOCUMENTS

| | | | |
|---|---|---|---|
| 4,498,660 A | 2/1985 | Brema et al. | |
| D298,040 S | 10/1988 | Legler et al. | |
| 5,337,641 A * | 8/1994 | Duginske | B27B 27/02 33/468 |
| D387,782 S | 12/1997 | Letendre | |
| 5,857,507 A * | 1/1999 | Puzio | B23Q 11/0042 144/287 |
| D415,177 S | 10/1999 | Miller et al. | |
| D449,318 S | 10/2001 | Schoene et al. | |
| D554,672 S | 11/2007 | Welsh et al. | |
| D555,804 S | 11/2007 | Christensen | |
| D646,541 S | 10/2011 | Andresen | |
| 8,167,512 B2 | 5/2012 | Christensen | |
| 8,808,600 B1 | 8/2014 | Christensen et al. | |
| D796,561 S | 9/2017 | Andrews, III | |
| 2007/0098490 A1 | 5/2007 | Christensen | |
| 2011/0150569 A1 | 6/2011 | Christensen | |
| 2014/0208912 A1 | 7/2014 | Wang | |
| 2021/0121994 A1 * | 4/2021 | Coleman | B23Q 11/0042 |
| 2021/0129372 A1 | 5/2021 | Shaw | |

(Continued)

OTHER PUBLICATIONS

Woodriver, WoodRiver Deluxe Drill Press Fence, Aug. 5, 2019, Amazon.com (Year: 2019).*

(Continued)

*Primary Examiner* — Sunil K Singh
*Assistant Examiner* — Eric Daniel Whitmire
(74) *Attorney, Agent, or Firm* — Sand, Sebolt & Wernow Co., LPA

(57) ABSTRACT

The present disclosure provides a system and method relating to work tables. The system comprises a table that attaches to a drill press. Specifically, the present disclosure relates to a drill press table with a fence and optionally a drawer, a vacuum assembly, flip stop assemblies, and various other components. Various operation of using the table are described herein.

22 Claims, 26 Drawing Sheets

(56) References Cited

U.S. PATENT DOCUMENTS

2021/0283798 A1   9/2021   Haller

OTHER PUBLICATIONS

Kamran Firooz and Dan Thornton, Drill-Press Table Supports Long Workpieces, 2018, Fine Woodworking, #265 (Year: 2018).*
DP-Pro Drill Press Table System Woodpeckers YouTube https://www.youtube.com/watch?v=oD6TOny1FEw Jun. 2, 2020 (Year: 2020) Improved Image Retrieved from the Internet Nov. 23, 2023.
https://www.woodcraft.com/products/deluxe-drill-press-fence-woodriver; Retrieved from the Internet Nov. 22, 2023.

* cited by examiner

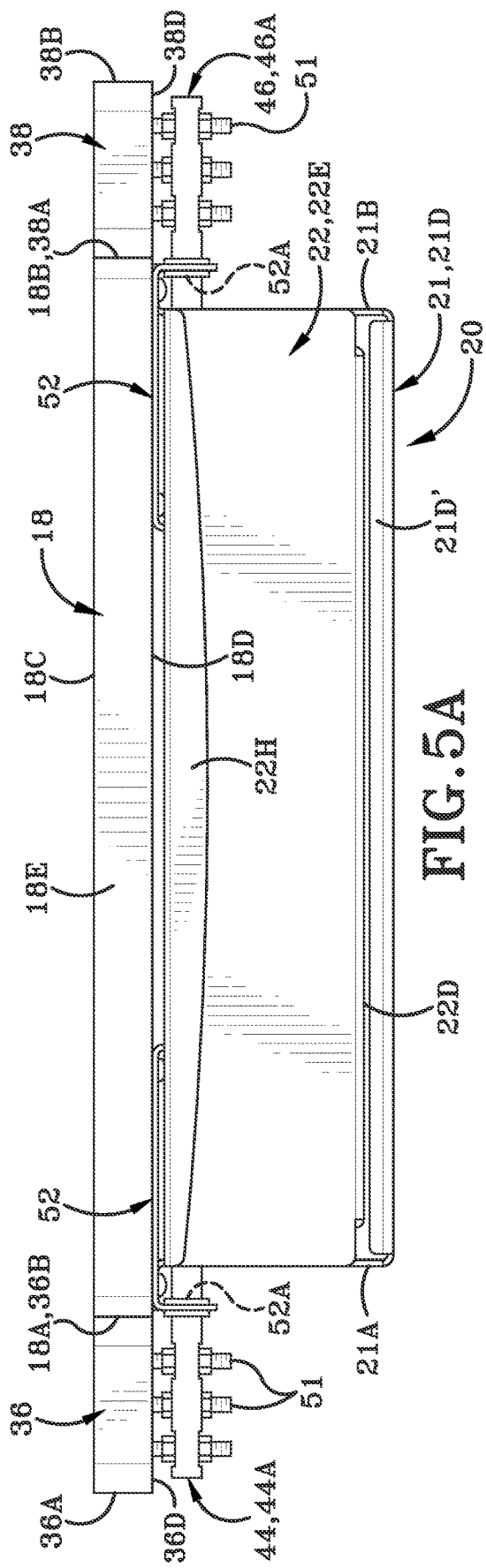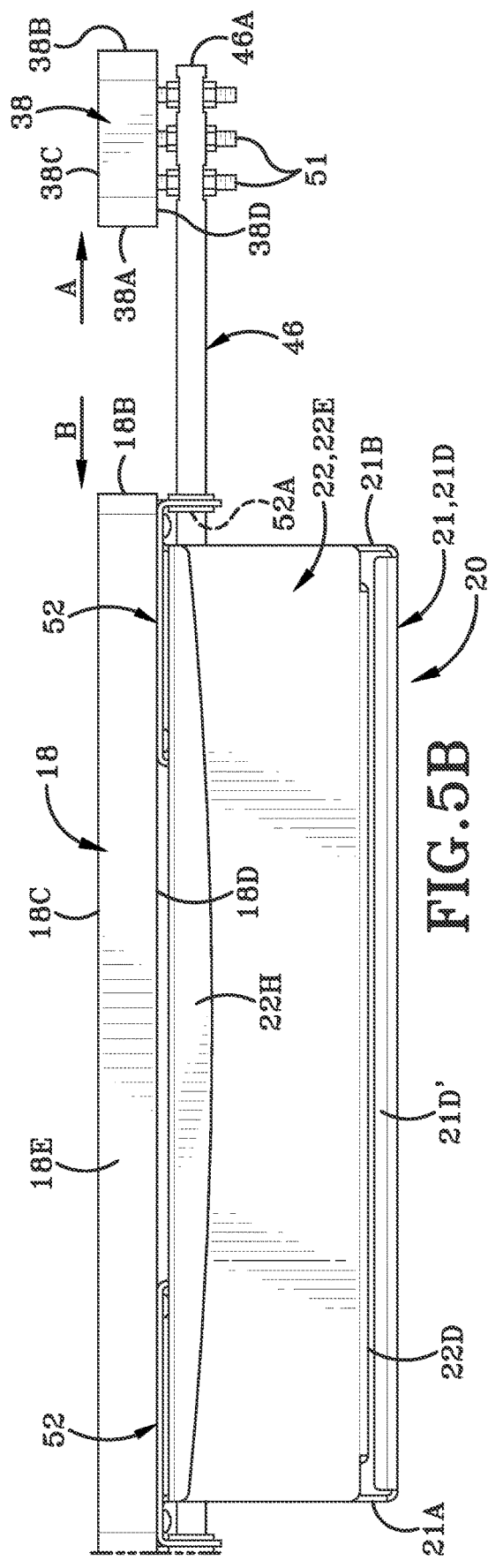

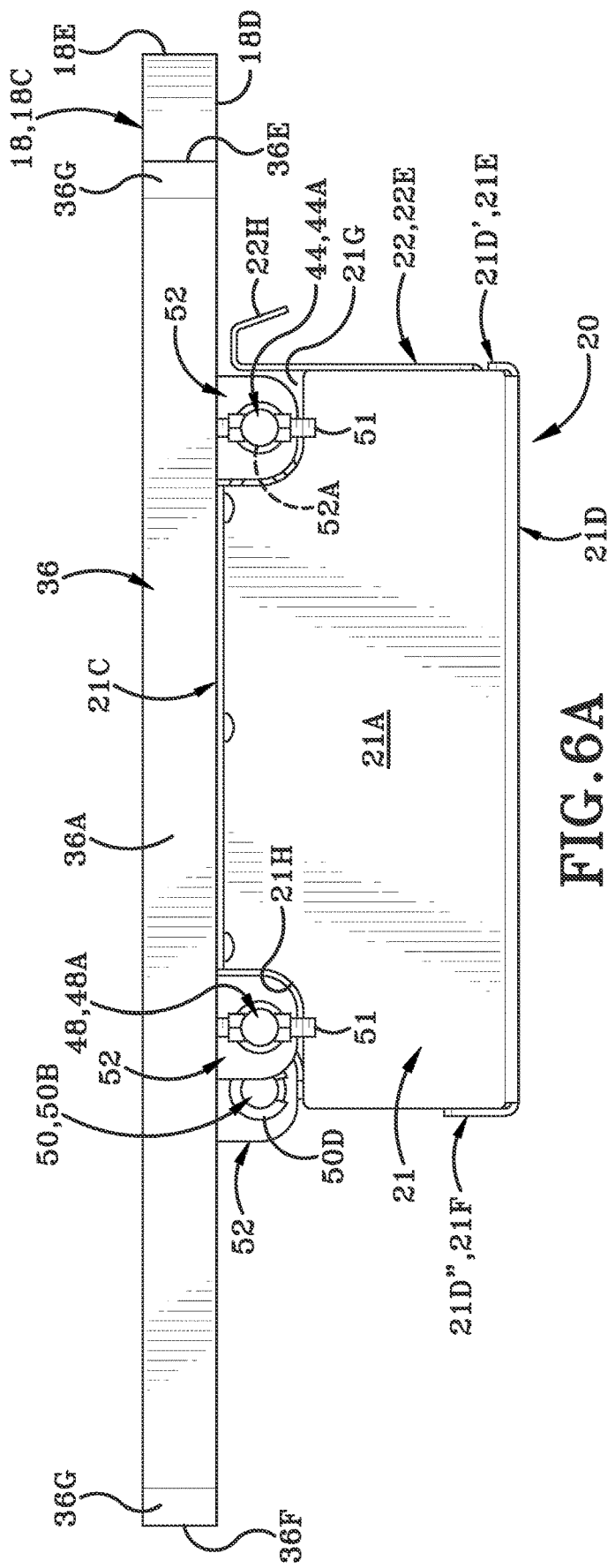

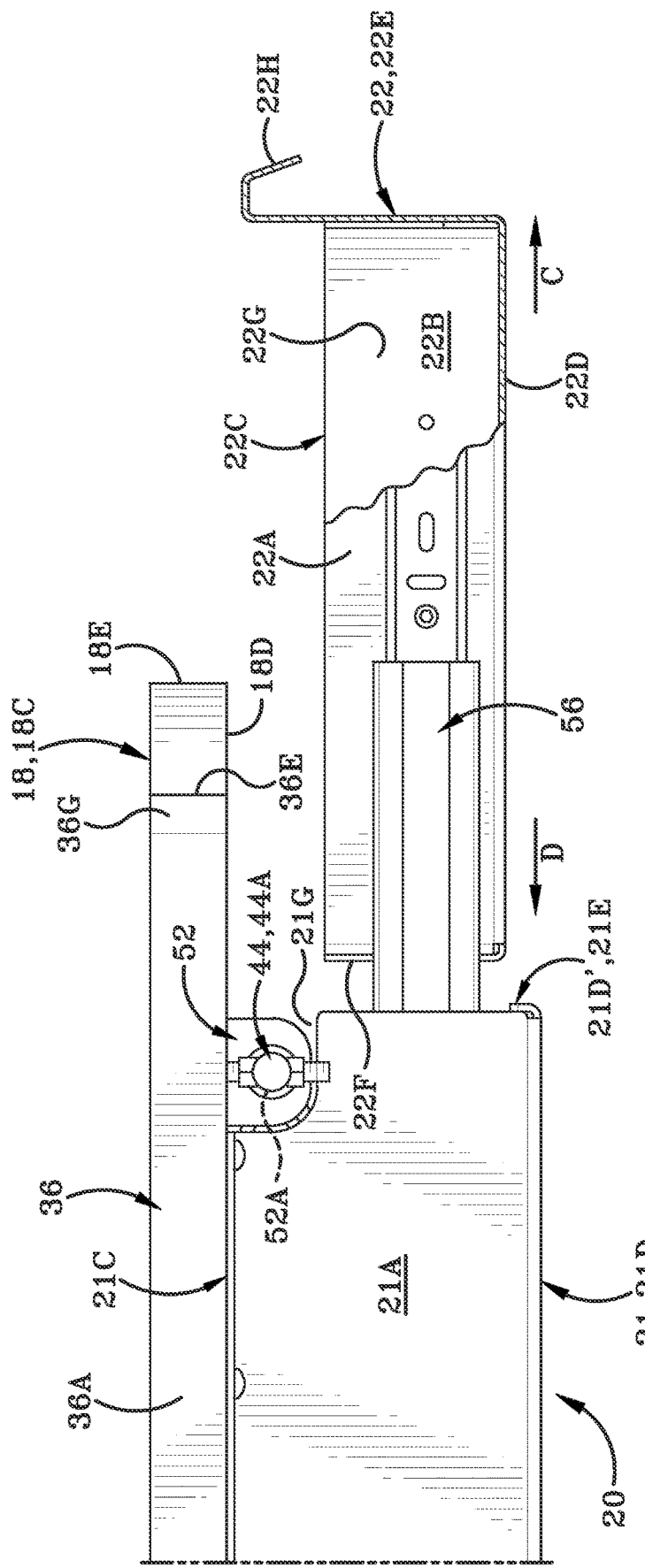

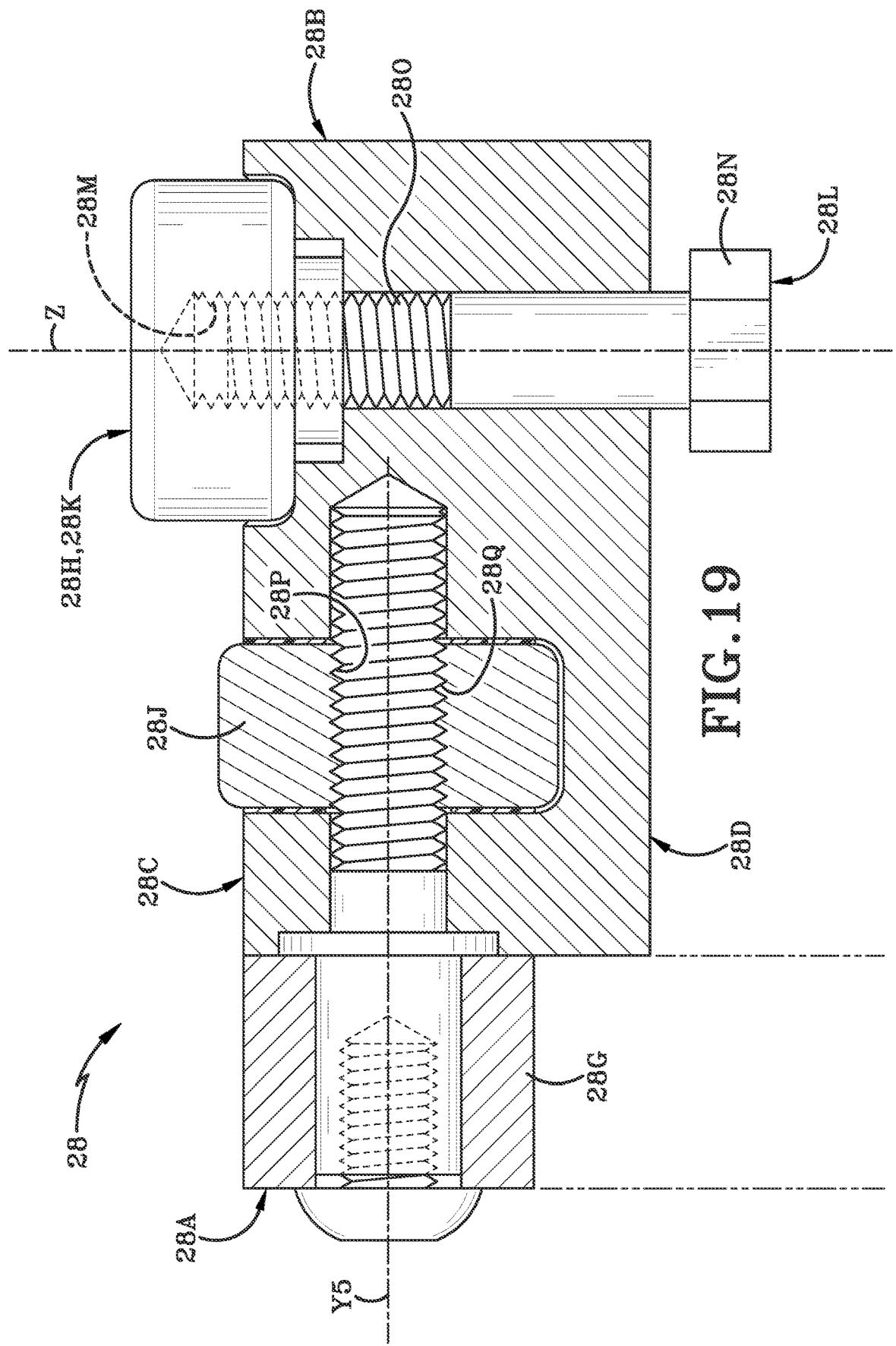

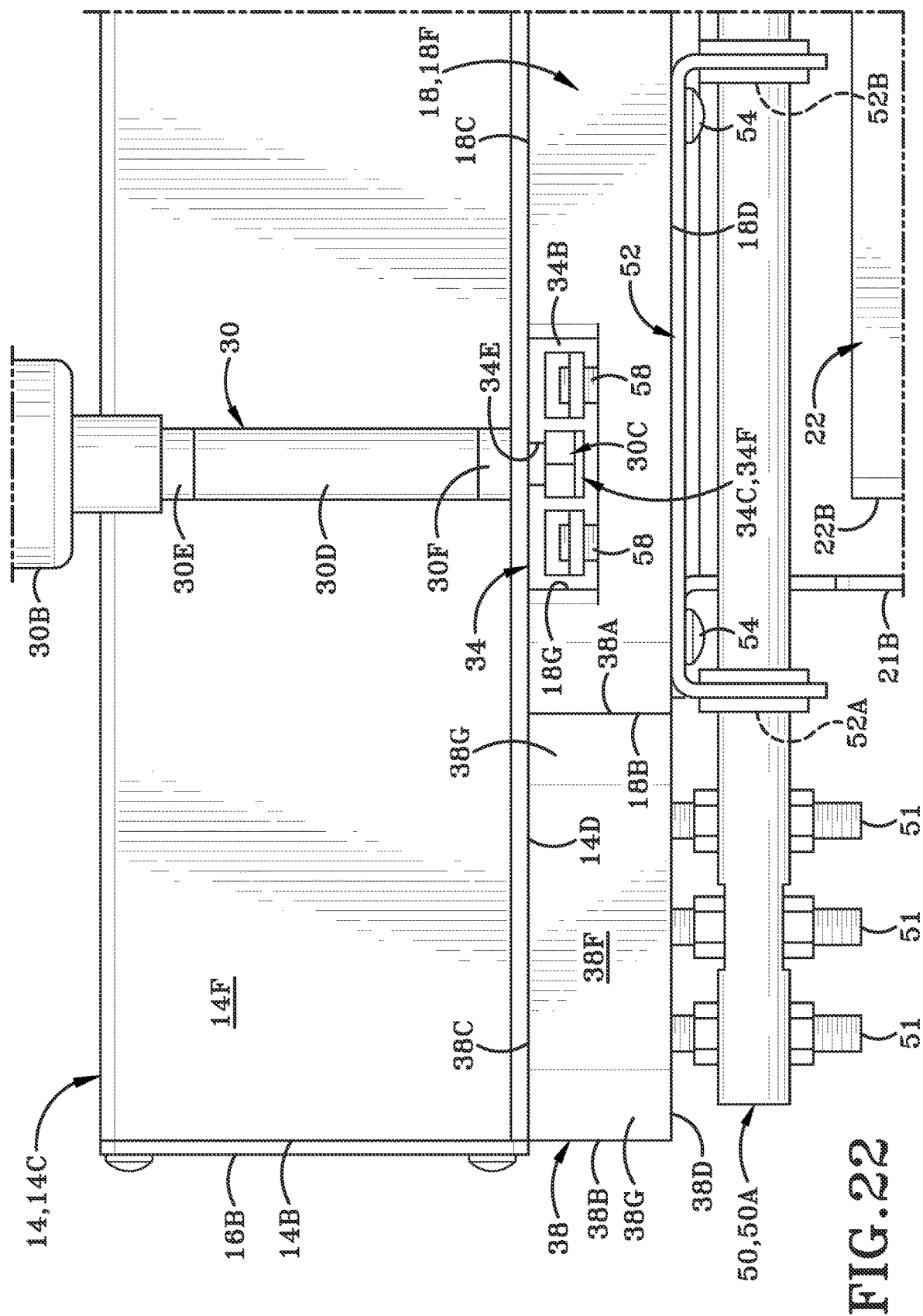

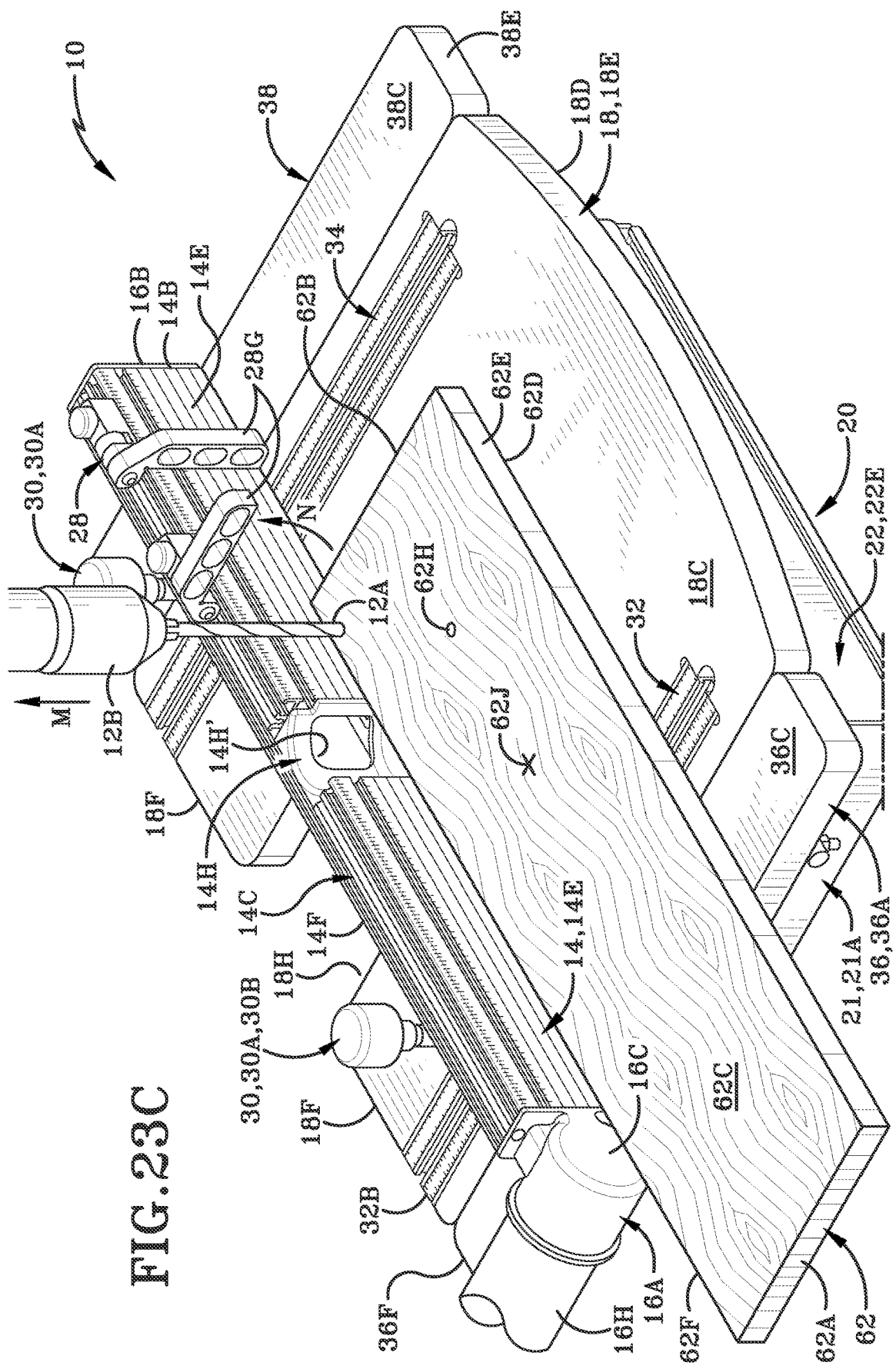

DRILL PRESS TABLE SYSTEM

BACKGROUND

Technical Field

The present disclosure relates generally to work tables. More particularly, the present disclosure relates to a table that attaches to a drill press. Specifically, the present disclosure relates to a drill press table with a fence and optionally a drawer, a vacuum assembly, flip stop assemblies, and various other components.

Background Information

Drill presses are used frequently to perform their functions on a variety of different workpieces, such as wood, metal, plastic, and similarly situated materials. Drill presses most commonly consist of a vertical post for supporting a vertically movable drill chuck, and a horizontal table positioned between the top and the bottom of the vertical post that holds a work piece. Generally, a bit is held by the vertically movable drill chuck and may be raised or lowered by an operator in relation to the table in order to drill a hole in a work piece held on the table. The drill press table may provide mechanisms or devices for holding the work piece such as a clamp. Further, a fence can also be provided so as to limit the movement of the work piece on the table in a given direction. The table can be movable in relation to the drill chuck along one or more axis so that the work piece can be operated on at different positions without requiring removal of the piece from the table holding mechanisms.

At times, work pieces may not fit conveniently on the table and may not easily be held on the table. This is particularly true for irregularly shaped or large work pieces. Further, attaching the work piece is traditionally only done in one direction, limiting the stability of the work piece during operation. The debris created through operation can be dangerous, hot, or otherwise undesirable as a result of the workpiece or high rotations during operation.

SUMMARY

Therefore, improvements to drill presses and their components are needed within the art.

In one aspect, an exemplary embodiment of the present disclosure may provide a system for removing dust comprising: a table with a surface; a fence with a body that is hollow with a first opening in a side of the fence to receive dust and a second opening in the side or another side of the fence, wherein the fence is adapted to be secured to the table; and a vacuum assembly operatively connected to the second opening of the fence and adapted to remove dust created at the first opening. This exemplary embodiment or another may provide a flip stop assembly comprising: an arm mechanism; a coarse adjustment mechanism; and a fine adjustment mechanism. This exemplary embodiment or another may provide the fine adjustment mechanism is rotatable about a longitudinal axis. This exemplary embodiment or another may provide the arm mechanism is pivotable about the longitudinal axis. This exemplary embodiment or another may provide the coarse adjustment mechanism is rotatable about a vertical axis. This exemplary embodiment or another may provide at least one channel along a top side of the fence. This exemplary embodiment or another may provide the flip stop engages the fence and is operative to be connected to the fence along a channel of the at least one channel along the top side of the fence. This exemplary embodiment or another may provide the fine adjustment mechanism is operative to move the arm mechanism along the longitudinal axis. This exemplary embodiment or another may provide a drawer vertically below the table and operatively connected to the table. This exemplary embodiment or another may provide at least one extension attached to the table to extend the surface of the table. This exemplary embodiment or another may provide a plurality of extension arms attached to at least one extension and engaged with the table. This exemplary embodiment or another may provide each of the plurality of extension arms extend along an independent longitudinal axis. This exemplary embodiment or another may provide indicia located on the fence to indicate that a drill bit connected to a drill press is properly indexed to a known value along a longitudinal axis. This exemplary embodiment or another may provide a first track located within a first aperture of the table, said first track having first central channel; a second track located within a second aperture of the table, said second track having second central channel; and the first track and second track having a first set of aligning indicia operative to indicate transverse location of the fence. This exemplary embodiment or another may provide a securement post adapted to secure the fence to the table and align the fence along a transverse axis. This exemplary embodiment or another may provide the first opening is lined with a chuck fitting adapted to accommodate a chuck from a drill press.

In another aspect, an exemplary embodiment of the present disclosure may provide a method for removing debris from a work surface comprising: connecting a fence to a table, wherein the fence has a body that is hollow with a first opening in a side of the fence to receive debris and a second opening in the side or another side of the fence; supplying power to a vacuum assembly; contacting a tool with a work piece; generating debris from said contacting; and removing debris created from the contact through the first opening and subsequently the hollow body of the fence. This exemplary embodiment or another may provide removing further comprises: removing the debris through the second opening of the fence. This exemplary embodiment or another may provide prior to supplying power: connecting the second opening to the vacuum assembly. This exemplary embodiment or another may provide aligning the fence with indicia located along at least one of an X axis or a Y axis. This exemplary embodiment or another may provide abutting a work piece against a flip stop operatively connected to the fence.

In yet another aspect, an exemplary embodiment of the present disclosure may provide a system for removing dust comprising: a table wherein the table comprises: a surface; a first track located within a first aperture of the table, said first track having first central channel; a second track located within a second aperture of the table, said second track having second central channel; and a fence adapted to be secured to the table at the first central channel of the first track and the second central channel of the second track; and wherein the first track and second track have a first set of aligning indicia operative to indicate transverse location of the fence; and wherein the fence has a second set of aligning indicia operative to indicate longitudinal location of the fence. This exemplary embodiment or another may provide a flip stop assembly comprising: an arm mechanism; a coarse adjustment mechanism; and a fine adjustment mechanism. This exemplary embodiment or another may provide the fine adjustment mechanism is rotatable about a longitudinal axis. This exemplary embodiment or another may provide the arm mechanism is pivotable about the longitudinal axis. This exemplary embodiment or another may provide the coarse adjustment mechanism is rotatable about a vertical axis. This exemplary embodiment or another may provide at least one channel along a top side of the fence. This exemplary embodiment or another may provide the flip stop engages the fence and is operative to be connected to the fence along a channel of the at least one channel along the top side of the fence. This exemplary embodiment or another may provide the fine adjustment mechanism is operative to move the arm mechanism along the longitudinal axis. This exemplary embodiment or another may provide a drawer vertically below the table and operatively connected to the table. This exemplary embodiment or another may provide at least one extension attached to the table to extend the surface of the table. This exemplary embodiment or another may provide a plurality of extension arms attached to at least one extension and engaged with the table. This exemplary embodiment or another may provide each of the plurality of extension arms extend along an independent longitudinal axis. This exemplary embodiment or another may provide the fence has a body that is hollow with a first opening in a side of the fence to receive dust and a second opening in the side or another side of the fence. This exemplary embodiment or another may provide a vacuum assembly operatively connected to the second opening of the fence and adapted to remove dust created at the first opening.

In another aspect, an exemplary embodiment of the present disclosure may provide a method for aligning a work piece on a table comprising: placing a portion of a first securement post into a central channel of a first track within a recess of the table; aligning indicia located on the first track indicating position of a fence; and securing the first securement post within a slot of the fence and within the central channel of the first track. This exemplary embodiment or another may provide placing a portion of a second securement post into a central channel of a second track within the recess of the table; aligning indicia located on the second track indicating position of the fence; and securing the second securement post within a slot of the fence and within the central channel of the second track. This exemplary embodiment or another may provide abutting a work piece against a flip stop operatively connected to the fence. This exemplary embodiment or another may provide extending a first extension thereby increasing a workable area of the table. This exemplary embodiment or another may provide extending a second extension thereby increasing the workable area of the table. This exemplary embodiment or another may provide attaching a bottom plate of the table to a base of a drill press.

BRIEF DESCRIPTION OF THE SEVERAL VIEWS OF THE DRAWINGS

A sample embodiment of the disclosure is set forth in the following description, is shown in the drawings, and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 5A is a front elevation view of an exemplary drawer attached to the exemplary table with the table in a collapsed position.

FIG. 5B is a front elevation view of the exemplary drawer attached to the exemplary table with the table in a partially extended position.

FIG. 6A is a left side elevation view of the exemplary drawer in a closed position attached to the exemplary table.

FIG. 6B is a left side elevation view of the exemplary drawer in an open position attached to the exemplary table.

FIG. 19 is a cross sectional view of the exemplary flip stop assembly looking in the direction of line 19-19 of FIG. 16.

FIG. 22 is a rear elevation view of the exemplary flip stop assembly engaged with a track of the exemplary fence.

FIG. 23C is a further front top left side isometric perspective operational view of the exemplary installed fence and the exemplary table while moving the flip stop assembly.

Similar numbers refer to similar parts throughout the drawings.

DETAILED DESCRIPTION

A new system 10 and method of operation thereof is depicted in the present disclosure and throughout FIGS. 1-23D. System 10 is a new and improved apparatus for use with a drill press, as will be discussed hereafter.

Figure 1:
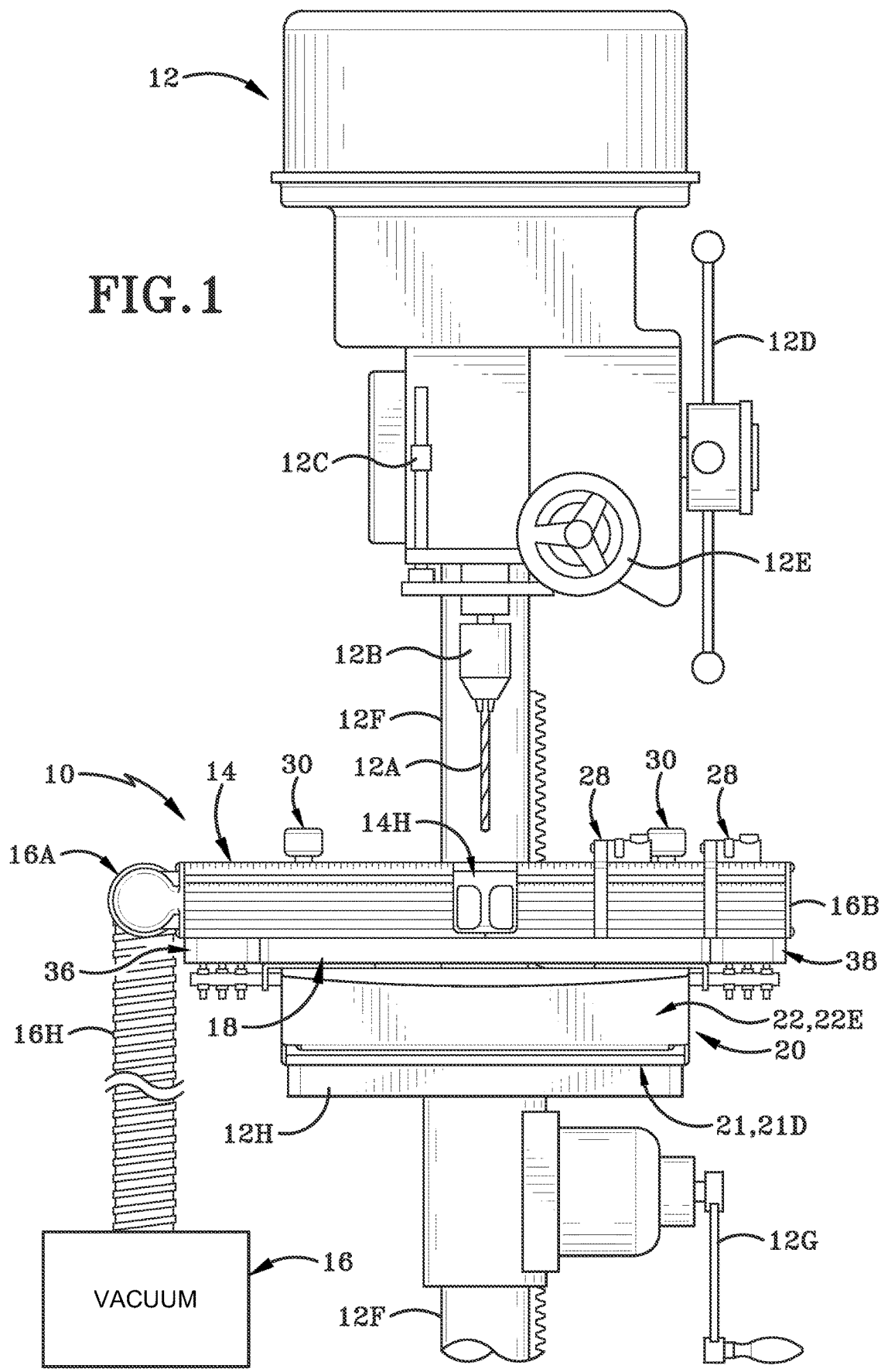
FIG. 1 is a front elevation view of an exemplary drill press with exemplary installed fence and exemplary table.

Referring now to FIG. 1, a front elevation view of the system 10 with an exemplary drill press 12 with installed fence 14, an exemplary vacuum assembly 16, table 18 and drawer 20 is shown. The exemplary system 10 need not include all of these parts. The exemplary system 10 may be sold or used as an add on to an existing exemplary drill press 12 in various pieces. Therefore, the system 10 as a whole may include the parts needed for the desired implementation.

The exemplary drill press 12 may include a body that comprises a bit 12A attached to a chuck 12B. The bit 12A is able to be changed by manipulating the chuck 12B. Further, the drill press may include a depth stop 12C to limit depth of the bit 12A into a work material and a pivot feed lever 12D operative to feed the bit into the material being worked on. The drill press 12 may further include a variable speed handle 12E that allows a user to set the correct speed for the material being drilled. Further the may be a column 12F to carry remaining pieces 14, 16, 20 and an adjustment mechanism 12G to move a base 12H of the drill press 12 up and down. One may realize that this drill press 12 is merely exemplary and additional features may be used depending on the desired implementation.

Figure 2:
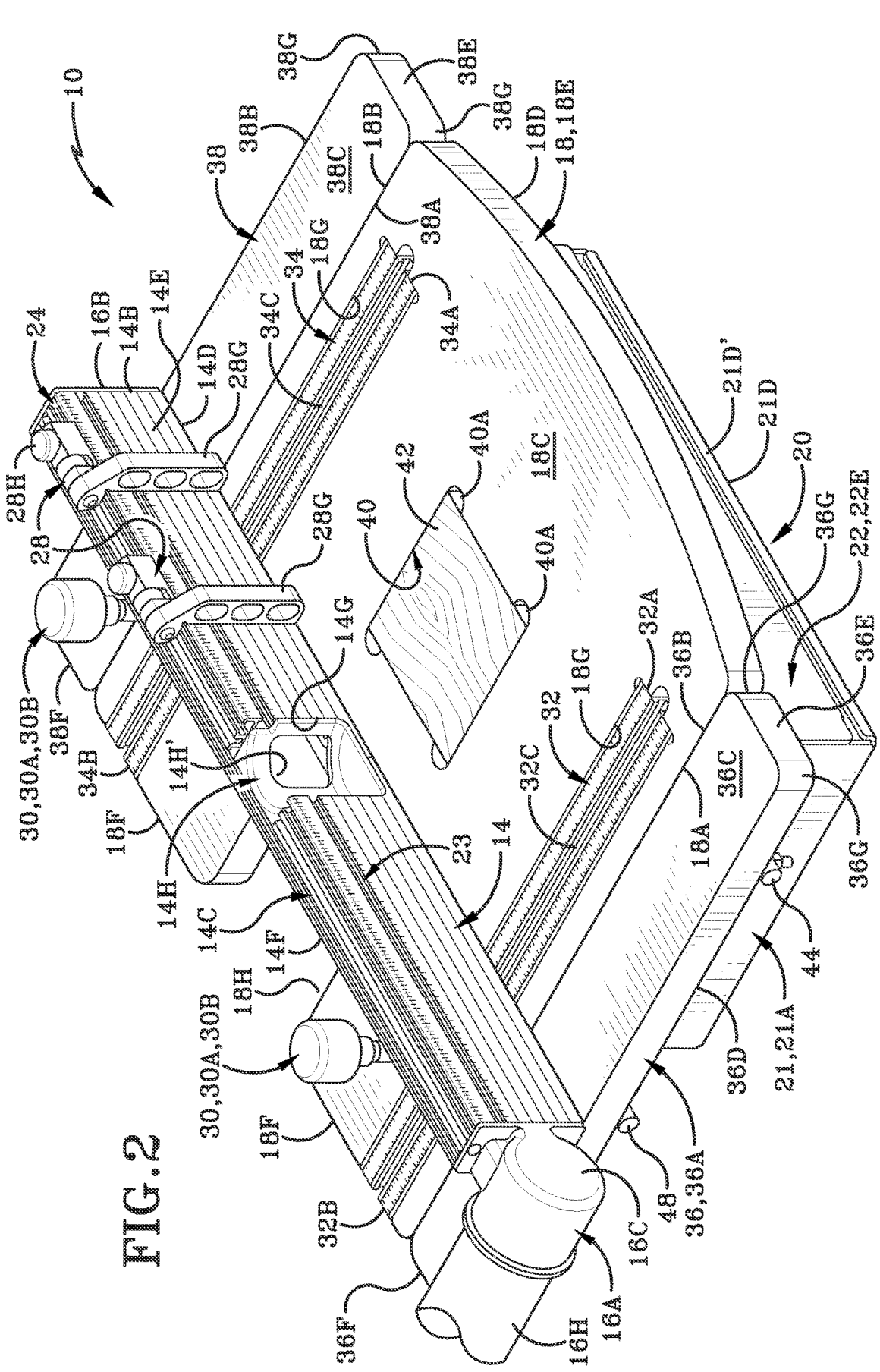
FIG. 2 is a front top left side isometric perspective view of the exemplary installed fence and the exemplary table.

Referring now to FIG. 2, a front top left side isometric perspective view of the installed fence 14, the exemplary table 18, and the exemplary drawer 20 is shown. The exemplary installed fence 14 has a generally hollow body with a first end 14A, a second end 14B longitudinally disposed to the first end 14A. The fence 14 further includes a top side 14C, a bottom side 14D vertically opposed from the top side 14C. Additionally, the fence 14 has a first side 14E and a second side 14F transversely opposed from the first side.

Within the fence 14 is an aperture 14G. The aperture 14G is rectangular in shape removing a portion of the first side 14E and a portion of the top side 14C between the first end 14A and second end 14B. Within the aperture 14G is a center chuck fitting 14H. The center chuck fitting 14H sits flush with the first side 14E on three sides and extends in a semi-circle towards the second side 14F. The center chuck fitting 14H provides two openings 14H' that expose a hollow interior 14J of the fence 14 as will be discussed further with respect to FIG. 12, FIG. 13, FIG. 14 and the operation.

In the exemplary embodiment the fence 14 has a vacuum port 16A on its first end 14A and a plate 16B on the second end 14B. In alternative embodiments the vacuum port 16A may be on the second end 14B and the plate 16B can be on the first end 14A depending on the desired implementation. The vacuum port 16A has a closed end 16C and an open end 16D transversely opposed to the closed end 16C. Additional information about the vacuum port 16A will be discussed later herein with respect to FIG. 13.

In the exemplary embodiment the fence 14 includes a first channel 23 located on the first side 14E, a second channel 24 located on the top side 14C and a third channel 26 also located on the top side 14C. The first channel 23 extends along the first side 14E in a longitudinal manner from the first end 14A to the second end 14B. The second channel 24 and third channel 26 extend along the top side 14C in a longitudinal manner from the first end 14A to the second end 14B. The channels 23, 24, 26 are narrow at a first end 23A, 24A, 26A, respectively, and bulbous at a second end 23B, 24B, 26B, respectfully. All channels 23, 24, 26 will be discussed later with respect to FIG. 16 and FIG. 20.

In the exemplary embodiment included are at least one flip stop assembly 28. The at least one flip stop assembly 28 has a body with a first end 28A and a second end 28B longitudinally opposed thereto. The at least one flip stop 28 further includes a top side 28C and a bottom side 28D vertically opposed thereto and a first side 28E and a second side 28F transversely opposed thereto. At the first end 28A the at least one flip stop assembly 28 includes an arm mechanism 28G. The arm mechanism 28G extends in a vertical manner from the top side 14C to the bottom side 14D of the fence 14.

Further included on the flip stop 28 is a coarse adjustment mechanism 28H and a fine adjustment mechanism 28J. The coarse adjustment mechanism 28H is located on the top side 28C of the flip stop assembly and rotates about a vertical axis. The fine adjustment mechanism is located between the first side 28E and second side 28F and rotates about a longitudinal axis. The flop stop assembly 28 is adapted to interface with at least one of the channels 24, 26 and will discussed with respect to FIG. 17-FIG. 20, and the operation. In the exemplary embodiment are securement posts 30. Securement posts 30 have a first end 30A with a knob 30B and will be discussed further with respect to FIG. 13, FIG. 16, FIG. 22 and with respect to the operation.

In the exemplary embodiment the exemplary table 18 includes a body with a first end 18A, a second end 18B longitudinally disposed to the first end 18A. The table 18 further includes a top side 18C, a bottom side 18D vertically opposed from the top side 18C. Additionally, the table 18 has a first side 18E and a second side 18F transversely opposed from the first side 18E. The first side 18E is generally convex in nature. The table further has a first track 32 and a second track 34 in a recess 18G in the top side 18C of the table 18. The first track 32 is located between the first end 18A and second end 18B, proximally closer to the first end 18A. The second track 34 is located between the first end 18A and second end 18B, proximally closer to the second end 18B. Each track 32, 34 has a first end 32A, 34A, respectively and a second end 32B, 34B which spans transversely from the spaced a distance away first side 18E to the second side 18F where the tracks 32, 34 terminate at their second end 32B, 34B commiserate with the second side 18F of the table 18. The tracks 32, 34 further include a central channel 32C, 34C, respectively, that runs the length of the tracks 32, 34 as will be discussed with respect to FIG. 8, FIG. 9, FIG. 10, and with respect to the operation.

The table 18 further includes a first extension 36 and a second extension 38. The first extension 36 includes a generally rectangular body with a first end 36A, a second end 36B longitudinally disposed to the first end 36A. The first extension 36 further includes a top side 36C, a bottom side 36D vertically opposed from the top side 36C. Additionally, the first extension 36 has a first side 36E and a second side 36F transversely opposed from the first side 36E. Between the first side 36E and the first end 36A is a rounded portion 36G that connects the first side 36E with the first end 36A that is generally convex in nature. Further, there are additional rounded portions 36G that connect the first side 36E with the second end 36B, the second side 36F with the first end 36A, and the second side 36F with the second end 36B.

The second extension arm 38 includes a generally rectangular body with a first end 38A, a second end 38B longitudinally disposed to the first end 38A. The second extension 38 further includes a top side 38C, a bottom side 38D vertically opposed from the top side 38C. Additionally, the second extension 38 has a first side 38E and a second side 38F transversely opposed from the first side 38E. Between the first side 38E and the first end 38A is a rounded portion 38G that connects the first side 38E with the first end 38A that is generally convex in nature. Further, there are additional rounded portions 38G that connect the first side 38E with the second end 38B, the second side 38F with the first end 38A, and the second side 38F with the second end 38B.

Further included on the table 18 is an aperture 40. The aperture 40 is located longitudinally between the first end 18A and second end 18B and transversely between the first side 18E and second side 18F. The aperture 40 is generally square in nature with a half circle rounded corner 40A on each of the four corners of the square. In the exemplary embodiment, the aperture 40 is filled with a sacrificial material 42. The sacrificial material 42 is generally square in shape and complementary to the shape of the aperture 40, less the half circles. In the exemplary embodiment the sacrificial material 42 is made of wood, plywood, Medium Density Fiberboard (MDF), High Density Fiberboard (HDF), Particle Board (PB), Polyvinyl Chloride (PVC), or mixtures thereof.

Figure 3:
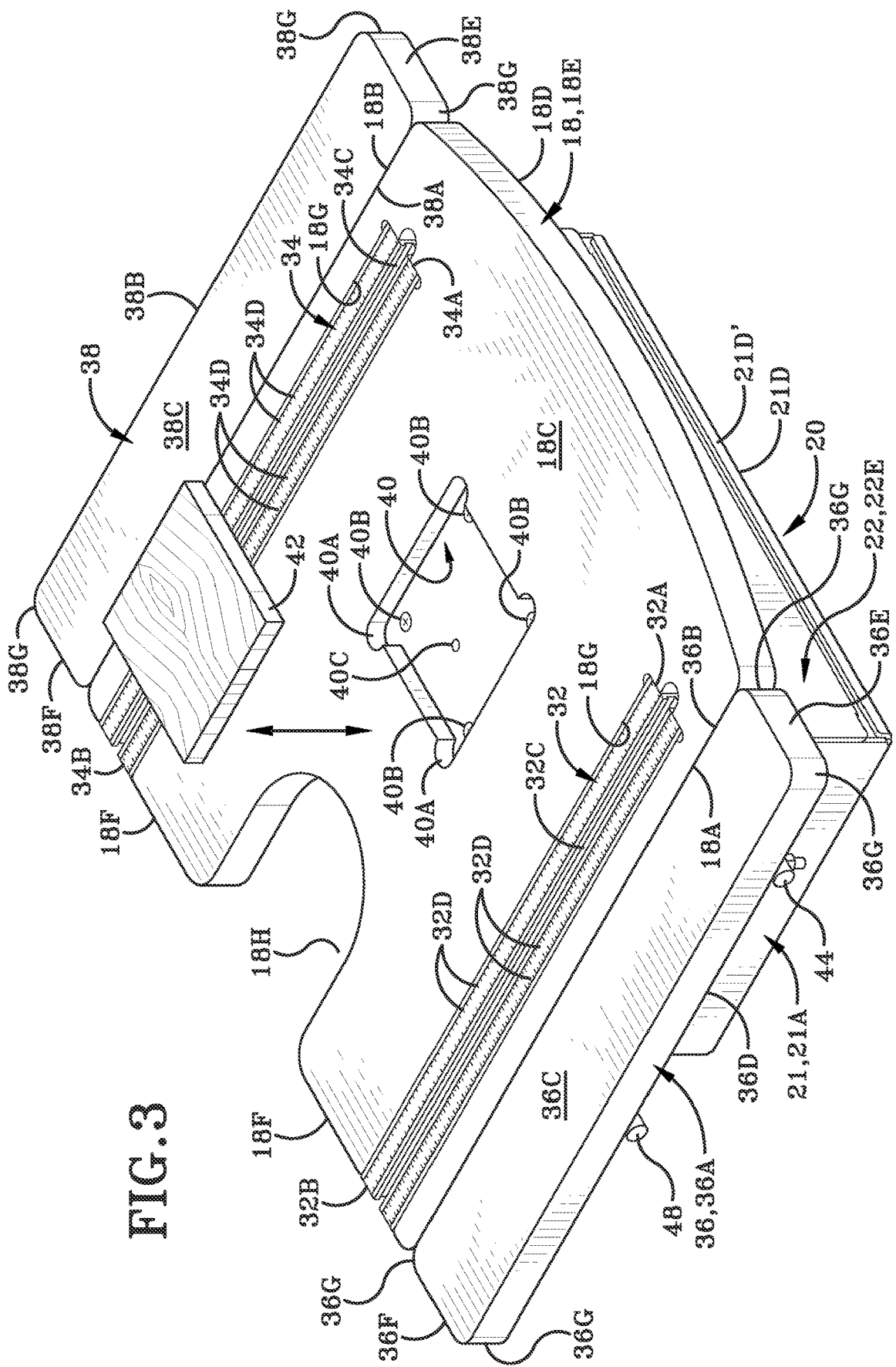
FIG. 3 is a front top left partially exploded side view of the exemplary table.

Referring specifically to FIG. 3 a front top left partially exploded side view of the exemplary table is shown. In this view, the sacrificial material 42 is shown removed from the aperture 40. Within the aperture 40 are shown four screws 40B in each proximate each rounded corner 40A. The four screws 40B and their relationship with the sacrificial material 42 will be explained with respect to the operation. Further shown is an aligning aperture 40C. The aligning aperture 40C is used to align the chuck 12B and the bit 12A of the drill press 12 to a zeroed and known distance. This will be discussed further with respect to FIG. 9, FIG. 12, and the operation.

Further shown in this figure is the second side 18F of the table. On the second side 18F there is a half oval recess 18H. The half oval recess 18H is operative to accept the column 12F of a drill press 12. Additionally, measurement indicia 32D, 34D, are shown on each track 32, 34.

Figure 4:
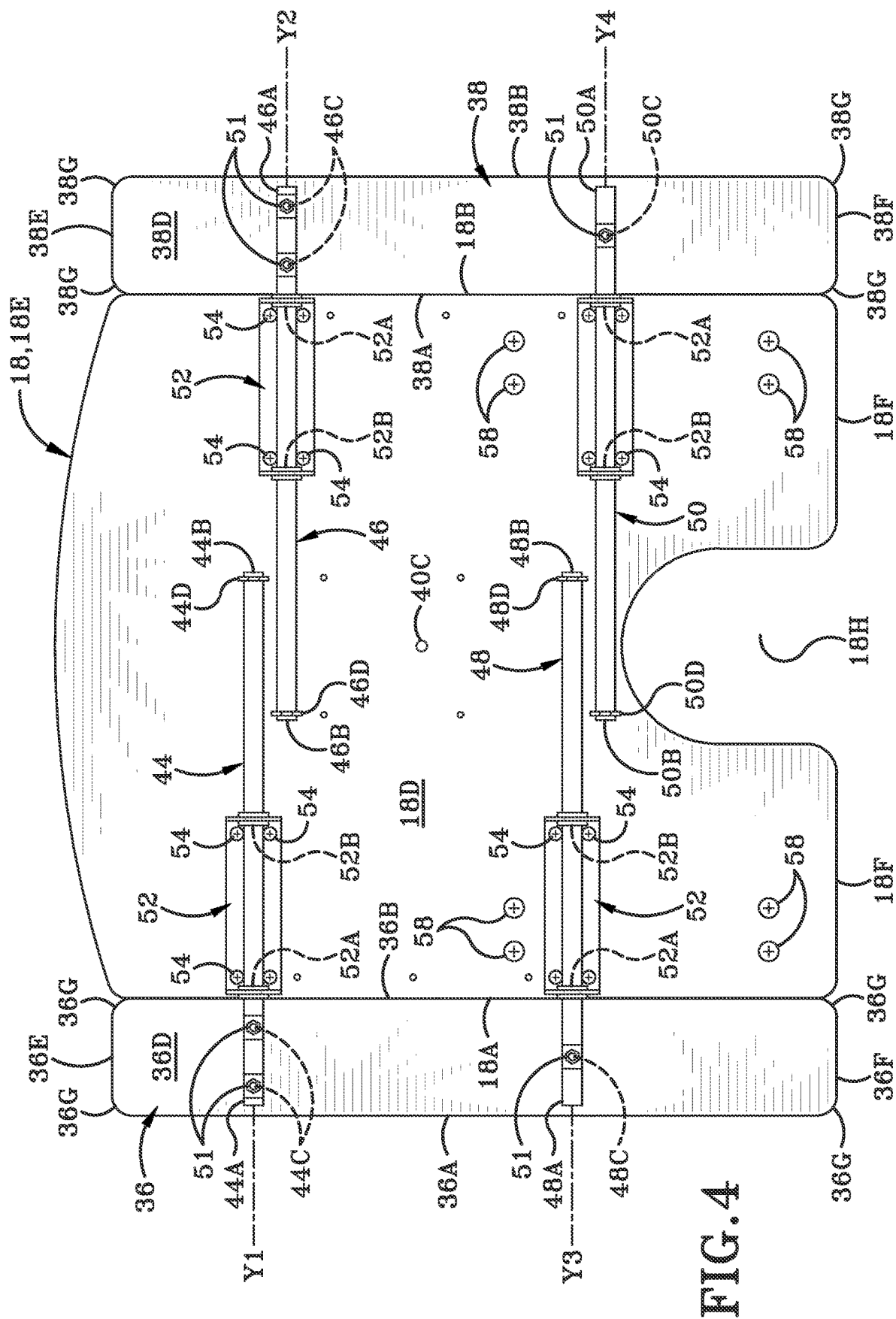
FIG. 4 is a bottom plan view of the exemplary table with extension arms shown.

Referring specifically to FIG. 4, a bottom plan view of the table 18 is shown. In this view the table 18, first extension 36, and the second extension 38 are able to be seen with extension arms 44, 46, 48 and 50 are shown. The extension arms 44, 46, 48, 50 have a body that is generally cylindrical in nature with a first end 44A, 46A, 48A, 50A, and a second end 44B, 46B, 48B, 50B. The extension arms 44, 48 at their first ends 44A, 48A are secured to the first extension 36 at its bottom side 36D by at least one fastener 51 through at least one aperture 44C, 48C proximate the first ends 44A, 48A contacting the first extension 36. While the extension arms 46, 50 at their first ends 46A, 50A are secured to the second extension 38 at its bottom side 38D by at least one fastener 51 through at least one aperture 46C, 50C proximate the first ends 46A, 50A contacting the second extension 38.

Each of the extension arms 44, 46, 48, 50 run along different parallel longitudinal axes Y1, Y2, Y3, Y4, respectfully. The extension arms 44, 46, 48, 50 are attached through brackets 52 attached to the bottom side 18D of the table 18. These brackets 52 are attached through fasteners 54 to the bottom side 18D of the table and include a first hole 52A and a second hole 52B. The first hole 52A and second hole 52B are aligned with their respective parallel longitudinal axes Y1, Y2, Y3, Y4. Each of the first hole 52A and second hole 52B are of a diameter slightly more than a diameter of the extension arms 44, 46, 48, 50. Further, the extension arms 44, 46, 48, 50 have a retaining mechanism 44D, 46D, 48D, 50D located on the second ends 44B, 46B, 48B, 50B of the extension arms 44, 46, 48, 50. The second end ends 44B, 46B, 48B, 50B of the extension arms 44, 46, 48, 50. with the retaining mechanism 44D, 46D, 48D, 50D installed allows the second end 44B, 46B, 48B, 50B to have a greater diameter than the second hole 52B, thereby restricting longitudinal movement. In some embodiments the second end 44B, 46B, 48B, 50B may be grooved or otherwise recessed to attach the retaining mechanism 44D, 46D, 48D, 50D. In the exemplary embodiment the retaining mechanism 44D, 46D, 48D, 50D is shown as a snap ring, but any similarly situated device depending on the desired implementation may be used. While in the illustrated embodiment there are two extension arms 44, 48 and 46, 50 shown for each extension 36, 38, respectively, one may understand that this is merely exemplary and as few as one or as many as practical may be used depending on the desired implementation.

Referring specifically to FIG. 5A and FIG. 5B, a front elevation view of an exemplary drawer 20 attached to the exemplary table 18 is shown. In FIG. 5A, the table 18 is shown in a collapsed position with the first extension 36 and second extension 38 collapsed with the extension arms 44, 46, 48, 50 not moved. While in FIG. 5B, the table is shown in a partially extended position with the second extension 38 extended which moves the extension arms 46 and 50 along their longitudinal axes Y2, Y4 away from the second end 18B of the table 18 along arrow "A". This movement extends the workable area of the table 18. The extension arms 46 and 50 are able to be moved along arrow "A" until the retaining mechanism 46D, 50D located at the second end 46B, 50B, make contact with the second hole 52B of the bracket 52. Similarly, if the extra space is not needed the second extension 38 may be collapsed back to the resting position as seen with the movement of arrow "B". This movement is limited by the physical contact between the second end 18B with the first end 38A of the second extension 38.

Similarly, but now shown for the sake of brevity, the table is shown in an additional partially extended position with the first extension 36 extended which moves the extension arms 44 and 48 along their longitudinal axes Y1, Y3 away from the first end 18A of the table 18. The extension arms 44 and 48 are able to be moved until the retaining mechanism 44D, 48D located at the second end 44B, 48B, make contact with the second hole 52B of the bracket 52. If all of the retaining mechanisms 44D, 46D, 48D, 50D are in contact with the second hole 52B of the bracket 52, the table 18 is in its fully extended position. Similar to the second extension 38, when the extra space is not needed the first extension 36 may be collapsed back to the resting position. This movement is limited by the physical contact between the first end 18A with the second end 36B of the first extension 36.

Figure 7:
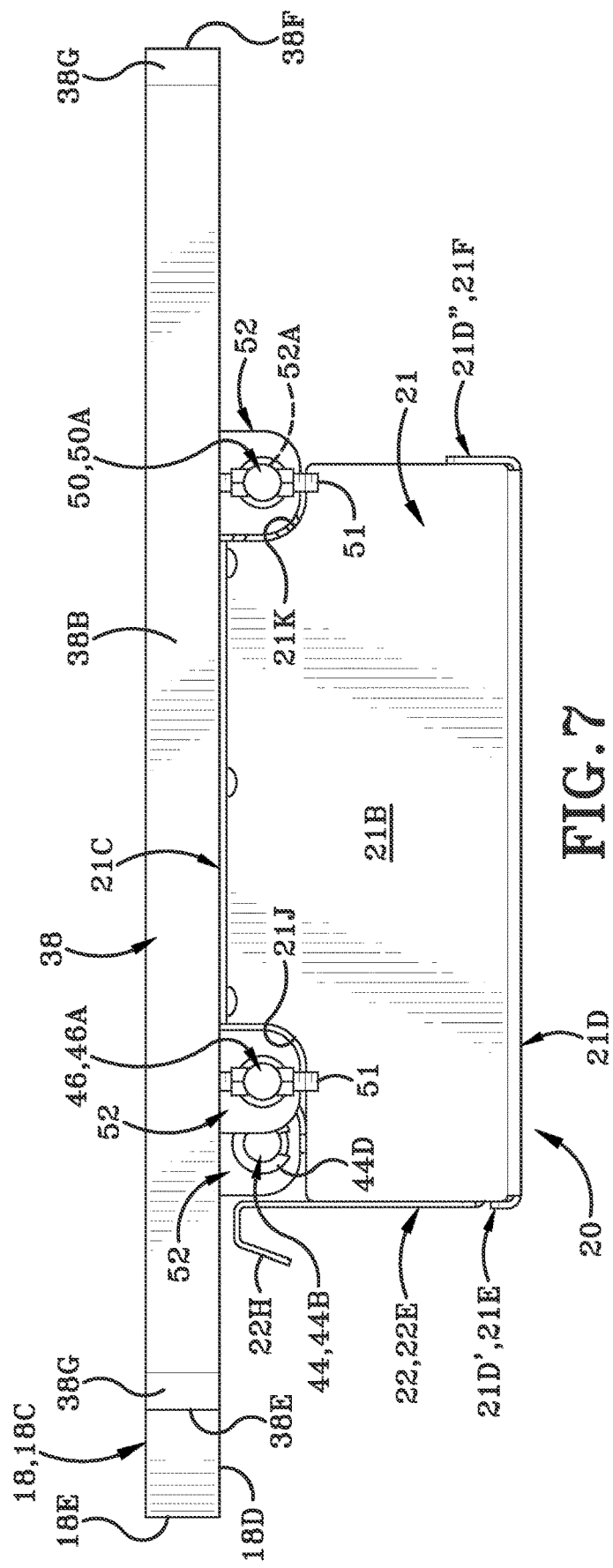
FIG. 7 is a right side elevation view of the exemplary drawer in a closed position attached to the exemplary table.

Referring specifically to FIG. 6A, FIG. 6B and FIG. 7, side views focusing on the table 18 and the exemplary drawer 20 are shown. In these views the drawer 20 may be seen to include an external body with a housing 21 with a first end 21A, a second end 21B longitudinally disposed to the first end 21A. The housing 21 further includes a top side 21C, a bottom side 21D vertically opposed from the top side 21C. Additionally, the housing 21 has a first side 21E and a second side 21F transversely opposed from the first side 21E. Proximate the location where first end 21A, the top side 21C, and the first side 21E intersect, there is a rounded first square shape 21G that is removed so as to accommodate the extension arm 46 passing through the interior of the housing 21. Additionally, proximate the location where first end 21A, the top side 21C, and the second side 21F intersect there is a second rounded square shape 21H so as to accommodate the extension arm 50 passing through the interior of the housing 21. Further, proximate the location where the second end 21B, the top side 21C, and the first side 21E intersect, there is a rounded square shape 21J that is removed so as to accommodate the extension arm 44 passing through the interior of the housing 21. Also, proximate the location where the second end 21B, the top side 21C, and the second side 21F intersect, there is a rounded square shape 21K that is removed so as to accommodate the extension arm 48 passing through the interior of the housing 21.

The bottom side 21D is reinforced slightly with a first lip 21D' proximate the first side 21E and a second lip 21D" proximate the second side 21F. The first lip 21D' is smaller than the second lip 21D" and extends in such a way to be commiserate with a portion of the first side 21E. The second lip 21D" extends in such a way to be commiseration with a portion of the second side 21F. On the first side 21E proximate the top 21C is a handle portion 21L. The handle portion 21L is generally L-shaped with the angle of the L being an obtuse angle. The top side 21C of the housing 21 is secured to the bottom side 18D of the table 18 through the use of fasteners 54.

Referring specifically to FIG. 6B, a left side elevation view of the exemplary drawer 20 in an open position is shown. In this view the internal drawer 22 is shown 22 with a first end 22A, a second end 22B longitudinally disposed to the first end 22A. The housing 22 further includes a top side 22C, a bottom side 22D vertically opposed from the top side 22C. Additionally, the housing 22 has a first side 22E and a second side 22F transversely opposed from the first side 22E. Further, in this view, the handle 22H has been pulled by a user and moves along arrow "C". This movement along arrow "C" exposes the interior 22G of the drawer and the drawer slide mechanism 56 attached to both the interior 22G of the drawer and the interior of the housing 21 at its first end 21A and second end 21B. The drawer 21 may also be moved along arrow "D", thereby closing the drawer.

Figure 8:
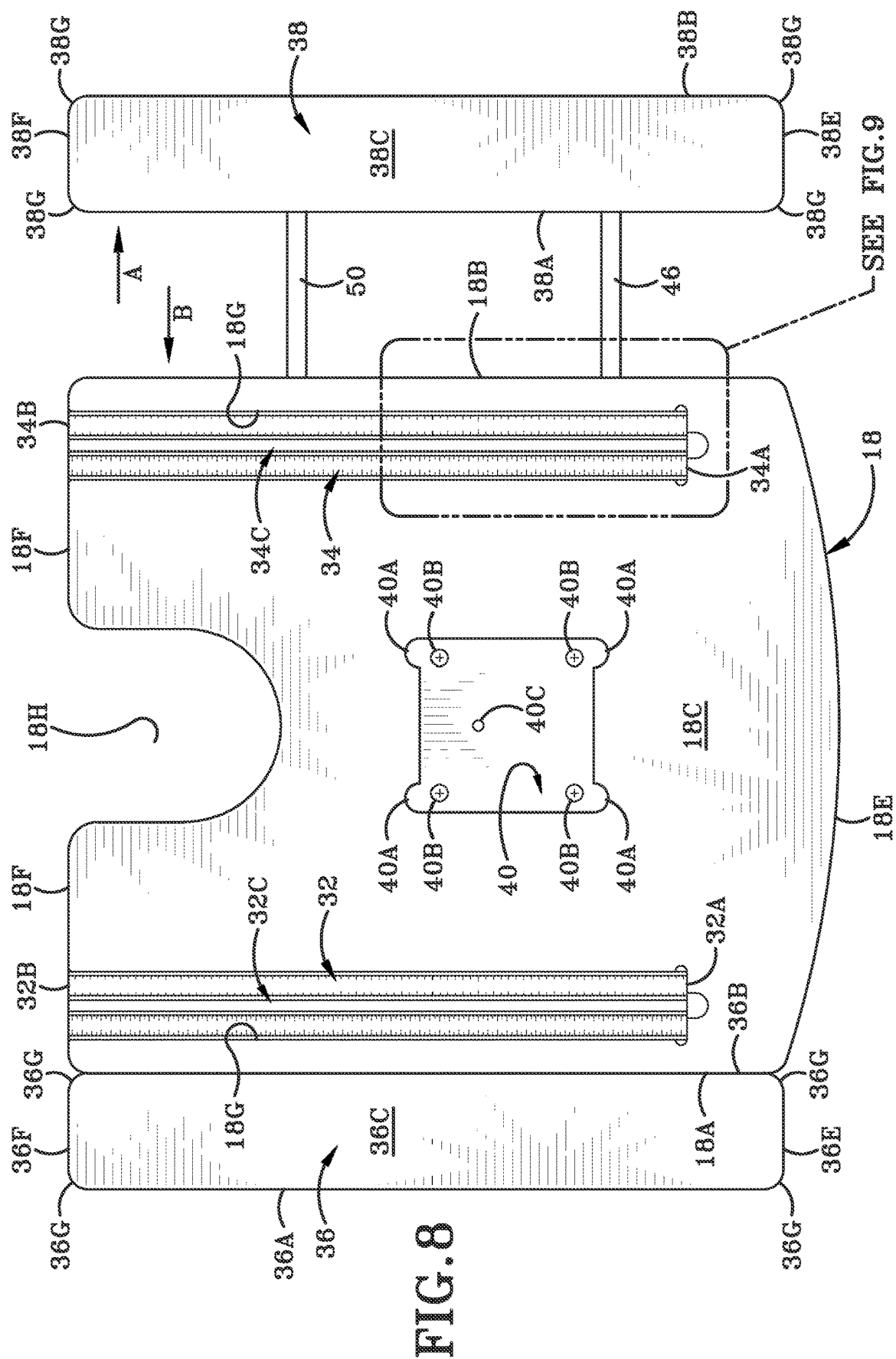
FIG. 8 is a top plan view of the exemplary table shown in the partially extended position.
Figure 9:
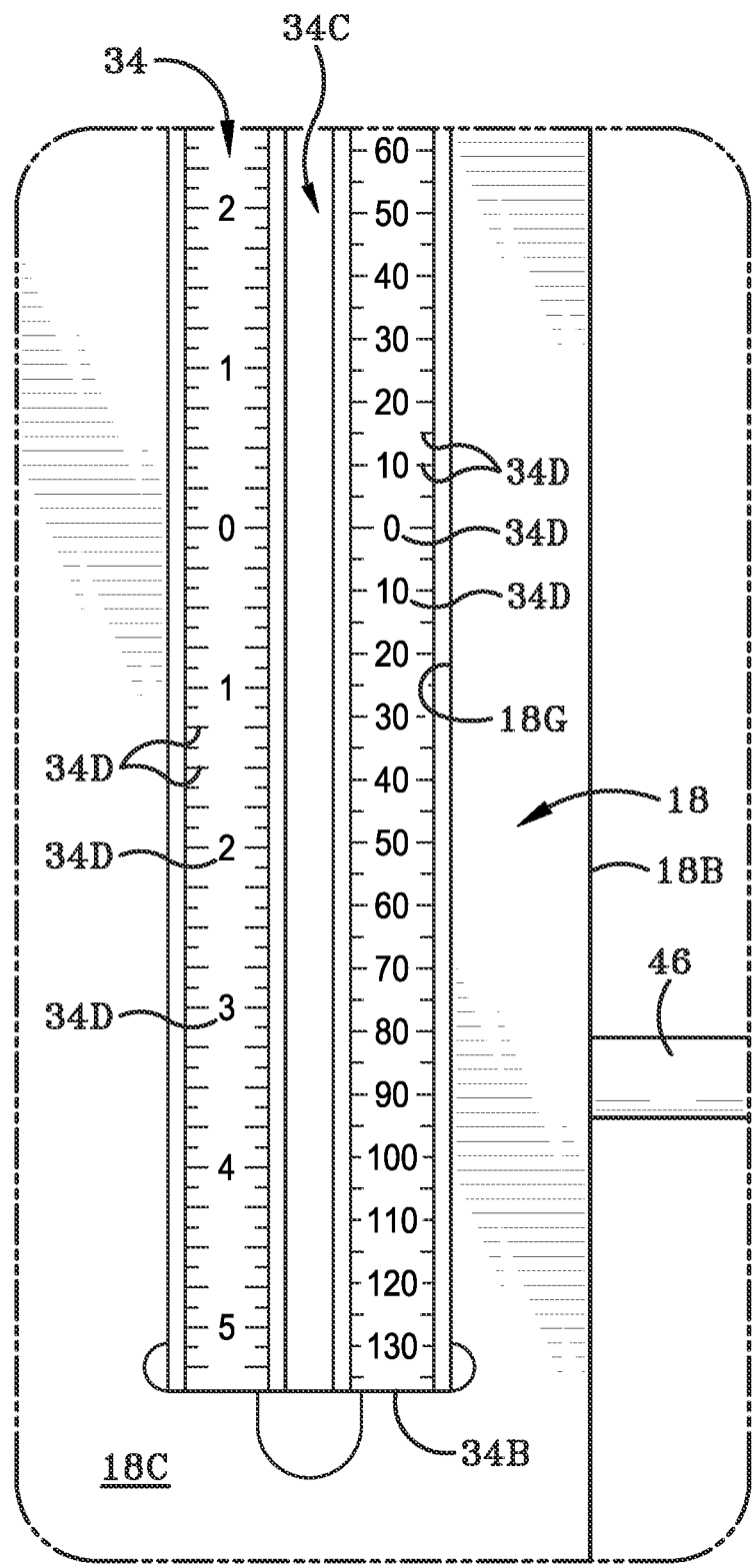
FIG. 9 is a top plan view of a track of the exemplary table from the highlighted region of FIG. 7.
Figure 10:
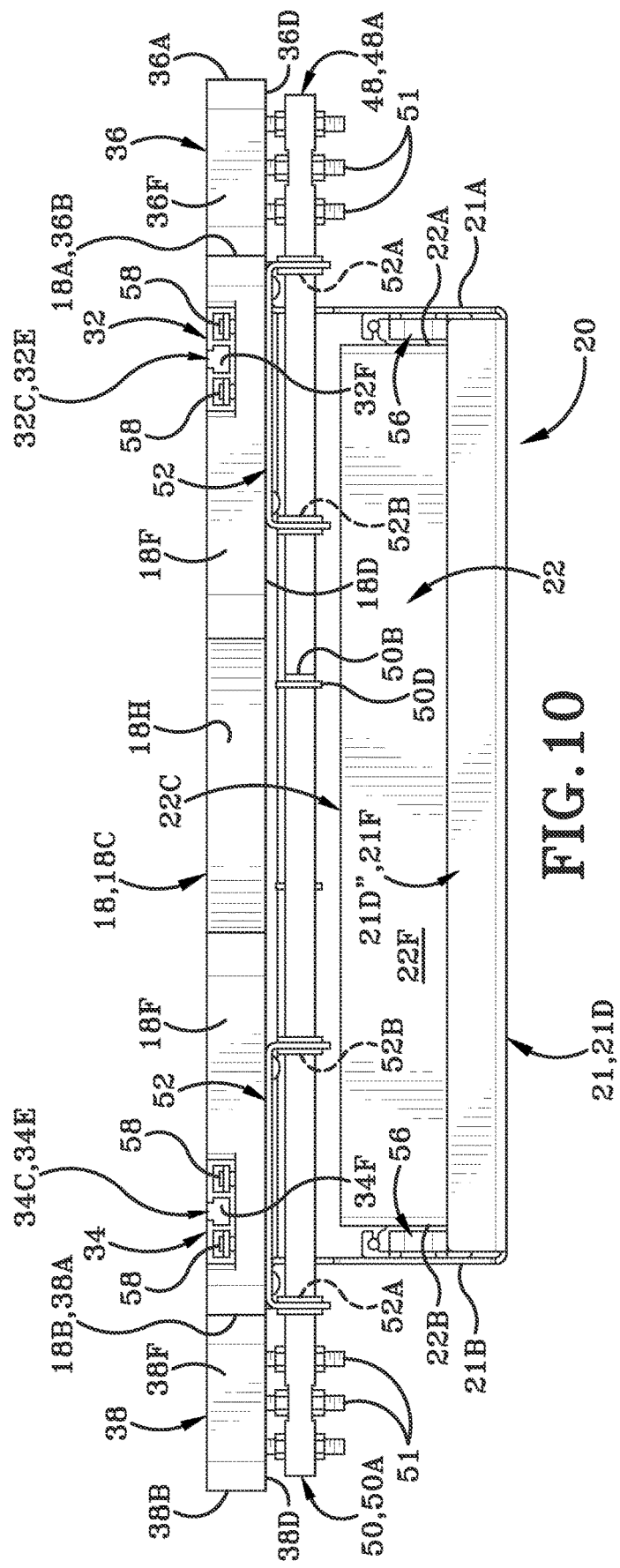
FIG. 10 is a rear elevation view of the exemplary drawer in the closed position attached to the exemplary table.

Referring to FIG. 8, FIG. 9, and FIG. 10 views of the exemplary table 18 are shown. Specifically, within FIG. 8, the table 18 is shown in the partially extended position. Further the measurement indicia 32D, 34D, are shown on each track 32, 34. Specifically, within FIG. 9, the measurement indicia 34D of track 34 are shown at zero at a specific point. The point where the track indicia 34D indicates zero is the same point where the aligning aperture 40C is located with the aperture 40. As such, the location of zero on the indicia 34D is used to align the chuck 12B and the bit 12A of the drill press 12 to a zeroed and known distance. While not shown for the point of brevity, track 32 and indicia 32D are identical to the track 34 and indicia 34D and function in an identical way so as to align the chuck 12B and bit 12A of the drill press 12 along a longitudinal axis.

Referring specifically to FIG. 10, the central channels 32C, 34C are shown from the second side 18F are shown. Specifically, the central channels 32C, 34C are identical in shape that have a narrow region 32E, 34E proximate the top 18C of the table 18 a bulbous region 32F, 34F distal of the top side 18C of the table 18. The channels 32C, 34C are so shaped so as to accept a body of a locking mechanism freely within them while preventing movement of a head of the locking mechanism that is larger than that of the narrow region 32E, 34E but smaller than the bulbous region 32F, 34F. Further, there are fasteners 58 that secure the tracks 32, 34 to the recesses 18G within the top surface 18C of the table 18.

Figure 11:
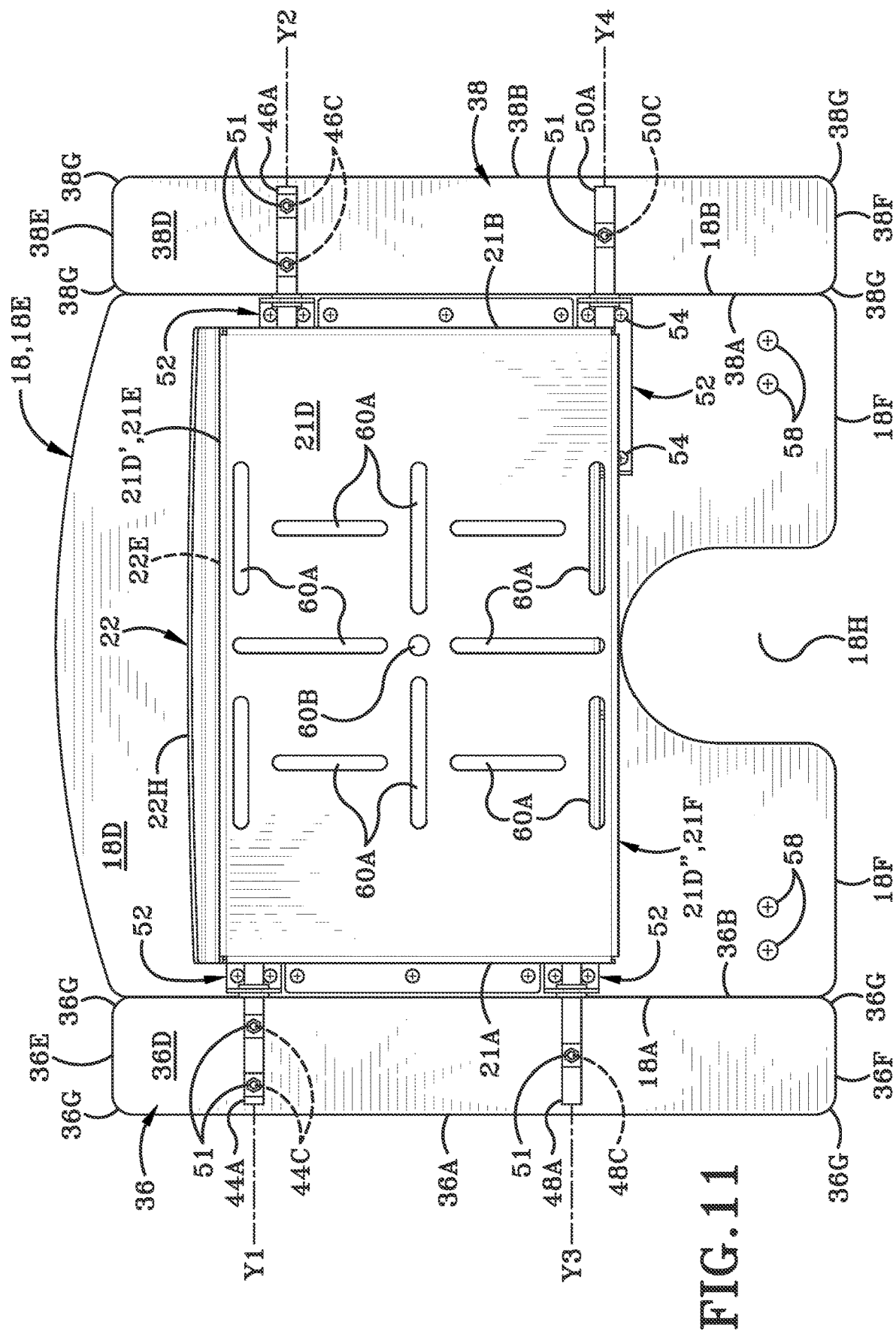
FIG. 11 is a bottom plan view of the exemplary drawer in the closed position attached to the exemplary table.

Referring specifically to FIG. 11, a bottom plan view of the exemplary drawer 20 in the closed position attached to the exemplary table 18. In this view, a bottom plate 21D can be seen. This bottom plate 21D is filled with a plurality of horizontal and vertical slots 60A and an aperture 60B collectively called mounting members.

The bottom plate 21D is so designed to intersect with virtually any pattern of slots in the factory drill press table base 12H. The outermost points where the slots 60A in the bottom plate 21D align with the slots in the factory table are the optimal points for securing the bottom plate 21D to the factory table. This may be done with a number of different attachment mechanisms depending on the desired implementation. While the bottom plate 21D is shown with a plurality of horizontal and vertical slots 60A and an aperture 60B one may understand that there could be additional horizontal or vertical slots, or even diagonal slots with a plurality of apertures depending on the desired implementation.

Figure 12:
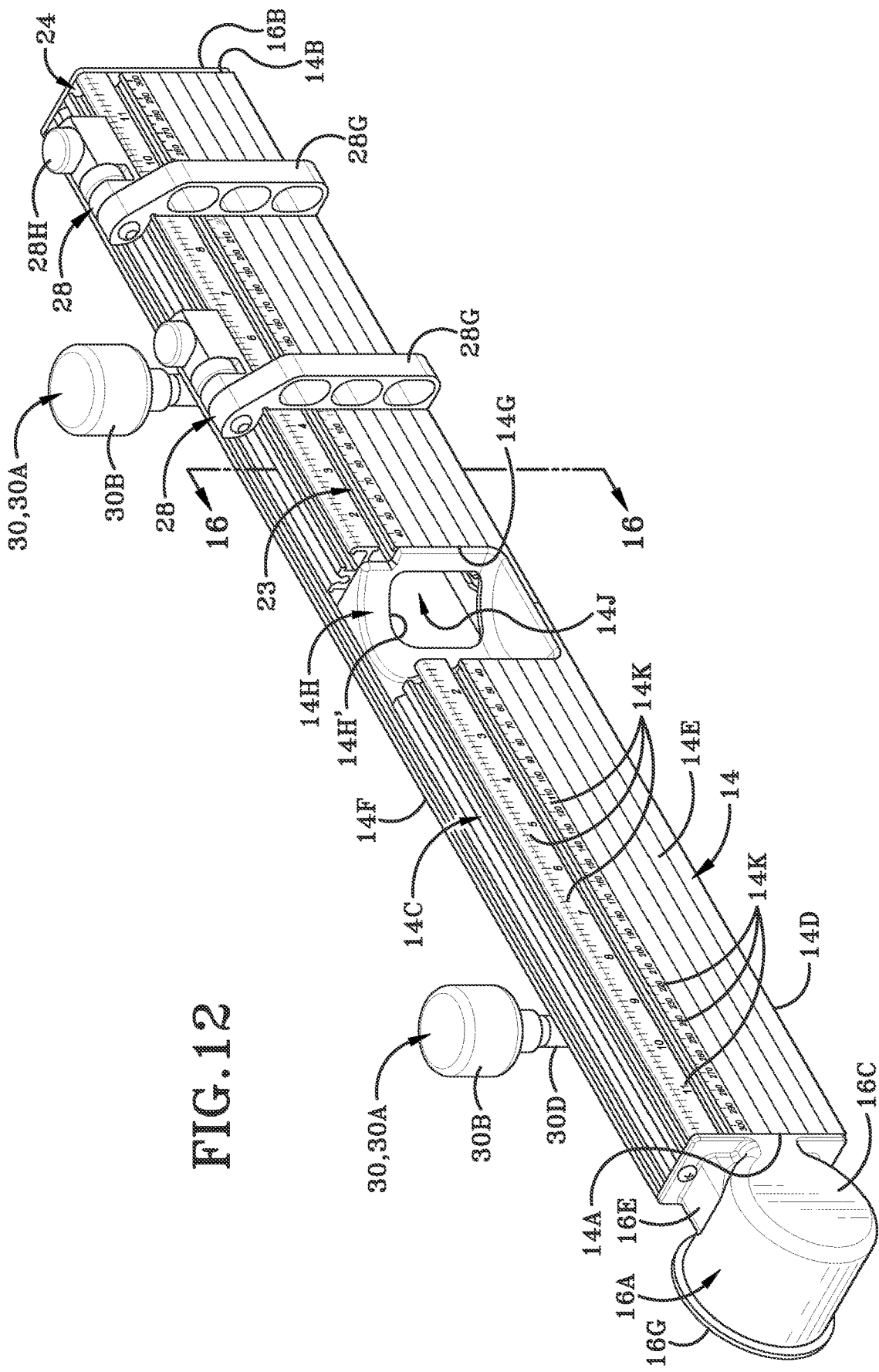
FIG. 12 is a front top left side isometric perspective view of the exemplary fence.

Referring specifically to FIG. 12 a front top left side isometric perspective view of the exemplary fence 14 is shown. The hollow interior 14J of the fence 14 is seen within the opening 14H' along with indicia 14K displayed along the first side 14E of the fence. The indicia 14K are indexed to be zeroed along a transverse axis X. The Transverse axis X bisects the aligning aperture 40C. Thereby, the aligning aperture is used to align the chuck 12B and bit 12A of the drill press 12 to the zeroed to the known distance.

Figure 13:
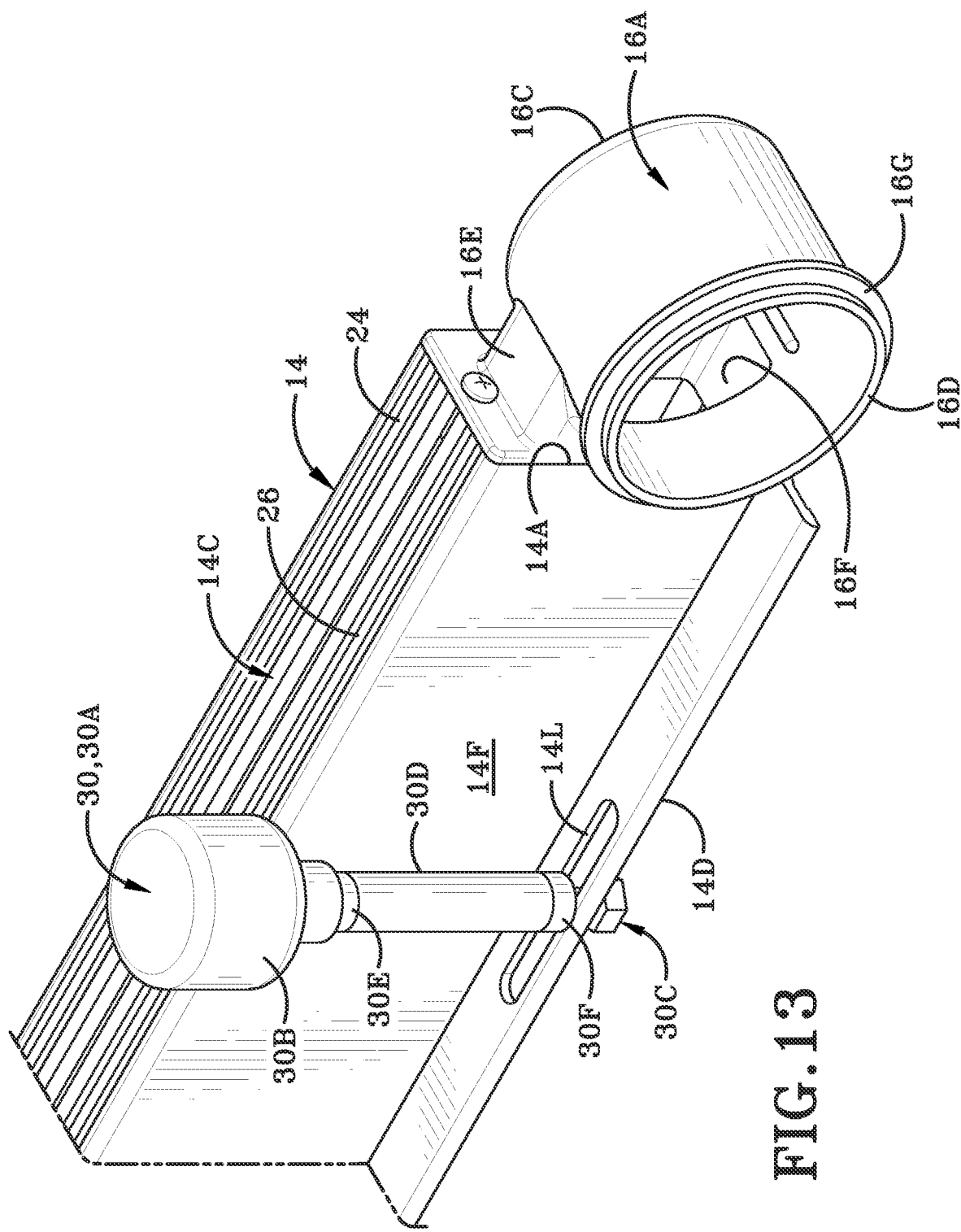
FIG. 13 is fragmentary rear front top left side isometric perspective view of the exemplary fence at a first end.

Referring specifically to FIG. 13, fragmentary rear front top left side isometric perspective view of the exemplary fence 14 at the first end 14A is shown. The vacuum port 16A in greater detail may be seen. Specifically, the vacuum port 16A has a body that is generally cylindrical with a rectangular section 16E that interfaces with the hollow interior 14J of the fence 14. The hollow portion 14J is in fluid connection with a hollow interior 16F of the vacuum port 16. The vacuum port further has an inner lip 16G located on the open end 16D adapted to interface with the hose of the vacuum assembly 16. The vacuum assembly 16 may include a motor (not shown) operatively connected to an impeller (not shown) and connected to a hose (now shown) so as to produce a pressure differential that promotes movement of particles generated at the aperture 14G to pass though the vacuum port 16A and continue to the hose and into a vacuum chamber (not shown).

Further, the securement post 30 is shown to have a body with the first end 30A and the knob 30B along with a second end 30C vertically disposed from the first end 30A, and a main body 30D generally between the first end 30A and second end 30C. Further included is a first washer 30E vertically below the knob 30B and above the main body 30D, and a second washer 30F vertically above the second end 30C and below the main body 30D. The second washer 30F is operative to sit on top of a slot 14L of the fence 14. The slot 14L is generally stadium shaped with a rectangle body with semicircles on a pair of opposite sides. The second end 30C is wider than that of the width of the slot 14L and therefore cannot pass through the slot 14L.

Figure 14:
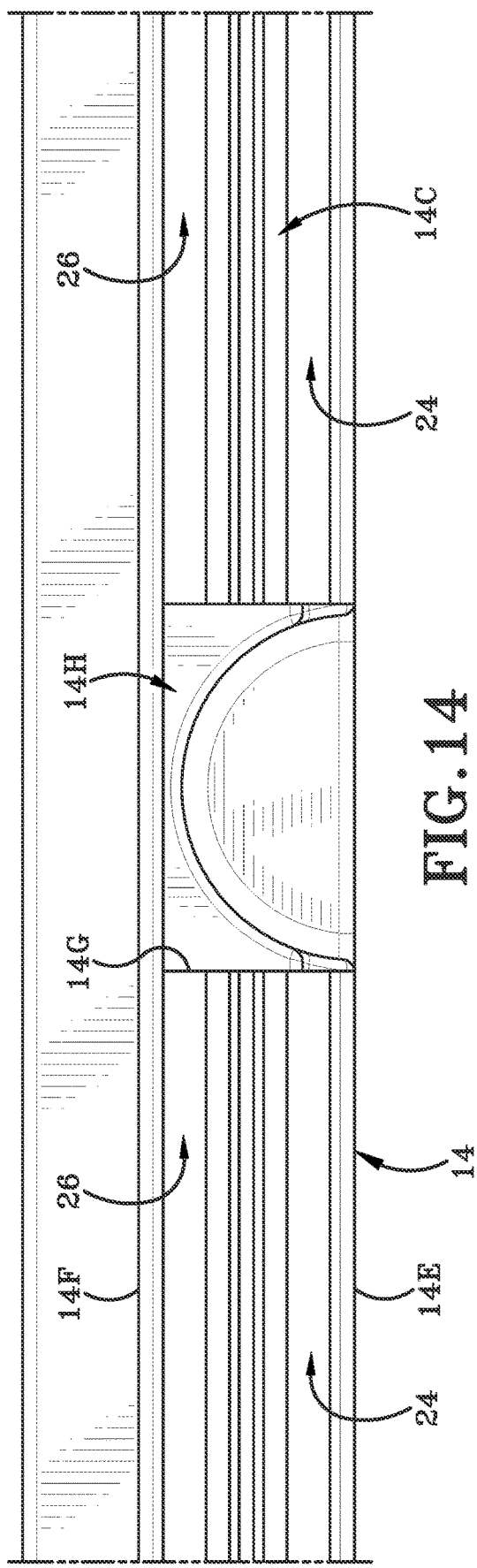
FIG. 14 is a fragmentary top plan view of the exemplary fence.
Figure 15:
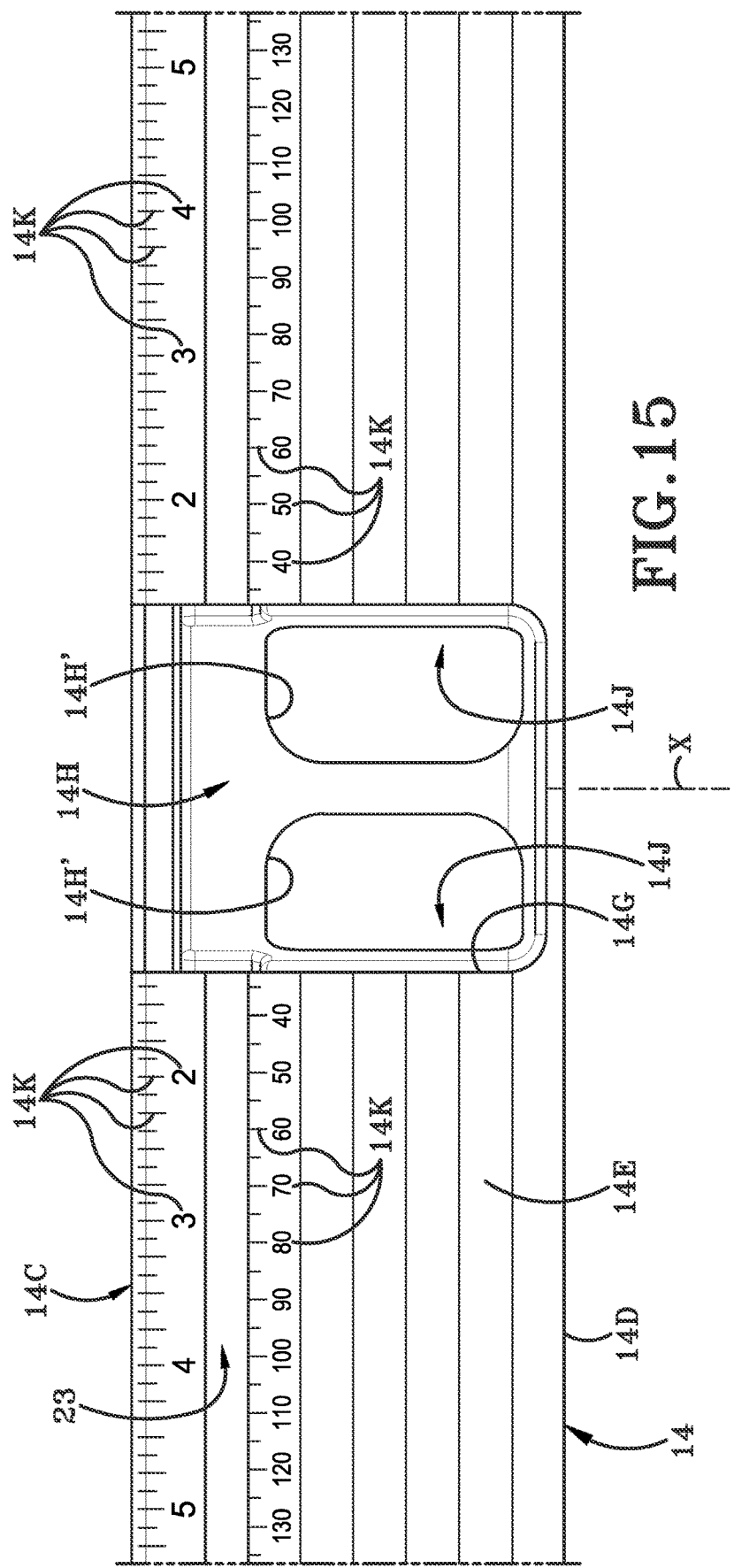
FIG. 15 is a fragmentary front elevation view of the exemplary fence.

Referring specifically to FIG. 14 and FIG. 15, fragmentary views of the exemplary fence 14 is shown. Specifically, the aperture 14G is shown with the center chuck fitting 14H within the aperture 14G. As can be seen in FIG. 14 and FIG. 15, the center chuck fitting 14H sits flush with the aperture 14G formed on first side 14E on three sides and extends in a semi-circle towards the second side 14F. Within FIG. 15, the indicia 14K are shown with greater detail. The X-axis may be seen so as to zero the fence 14.

Figure 16:
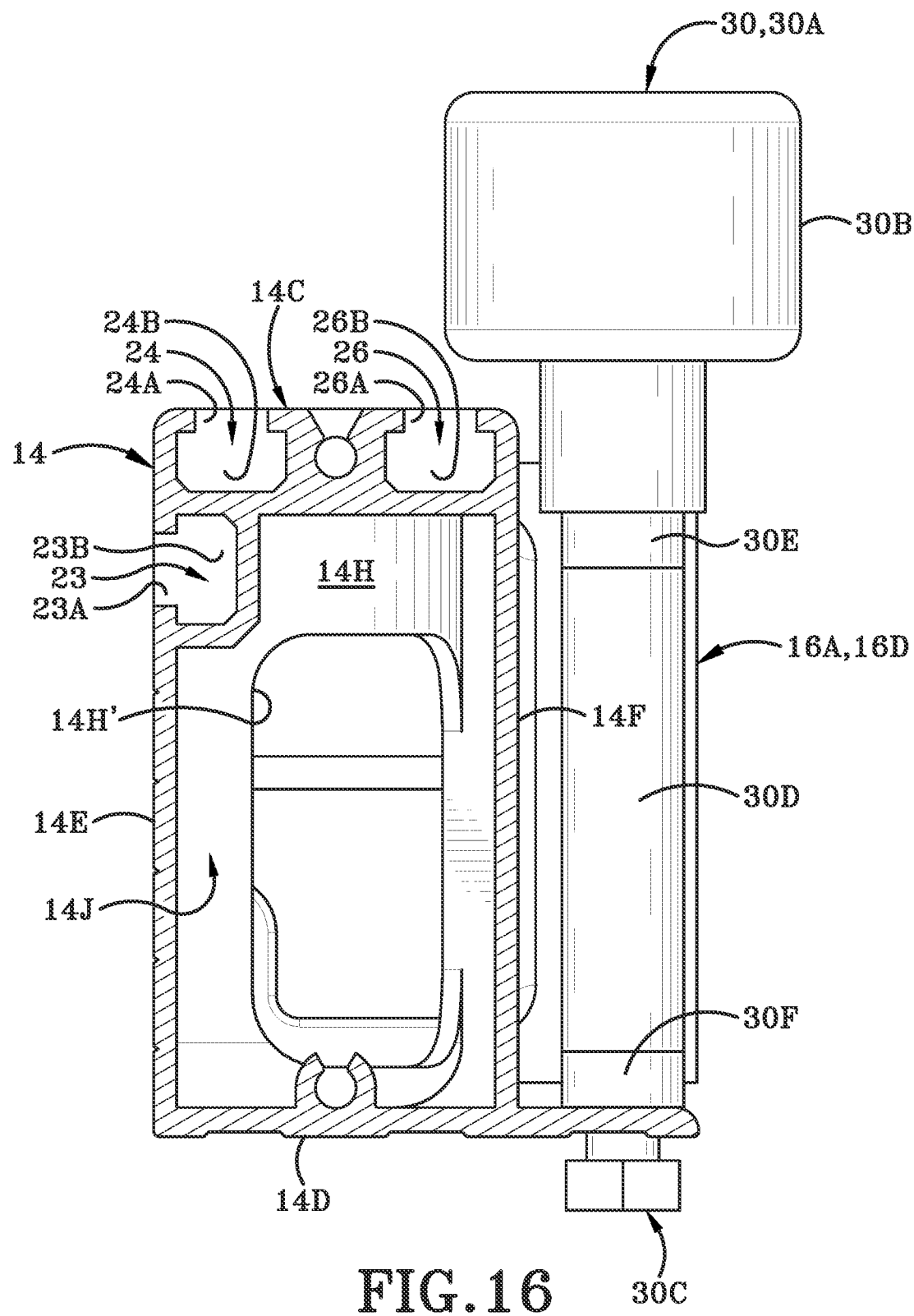
FIG. 16 is a cross sectional view of the exemplary fence looking in the direction of line 16-16 of FIG. 12.
Figure 18:
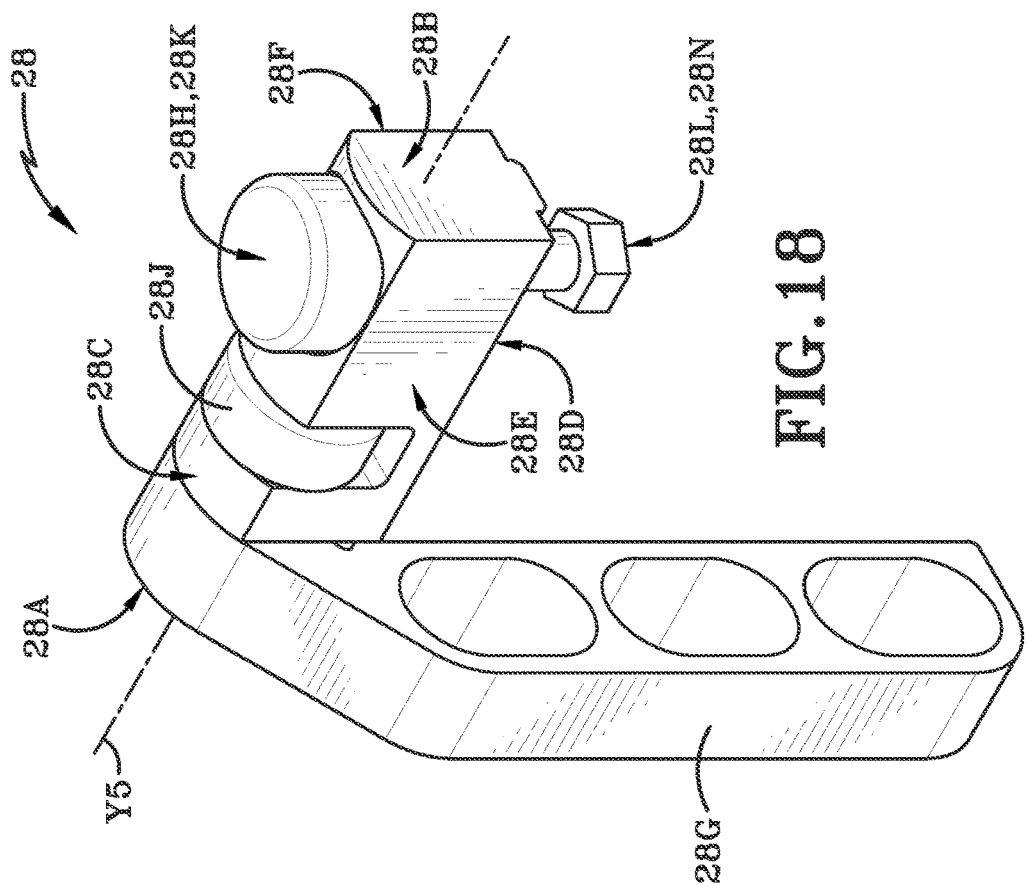
FIG. 18 is a front top right side view of the exemplary flip stop assembly.

Referring now to FIG. 16, a cross sectional view of the exemplary fence 14 looking in the direction of line 16-16 of FIG. 12 is shown. The channels 23, 24, 26 are shown to be narrow at the first end 23A, 24A, 26A, respectively, and bulbous at a second end 23B, 24B, 26B, respectfully. Further, the hollow interior 14J of the fence 14 may be seen. Additionally, the securement post 30 is shown interfacing with the slot 14L of the fence 14.

Referring specifically to FIG. 17-FIG. 20 the exemplary flip stop assembly 28 in various views is shown. The at least one flip stop assembly 28 has a body with the first end 28A and the second end 28B longitudinally opposed thereto with an axis Y5 running between the first end 28A and second end 28B. The arm mechanism 28G is operative to rotate about the axis Y5 as will be discussed further with respect to operation.

Figure 17:
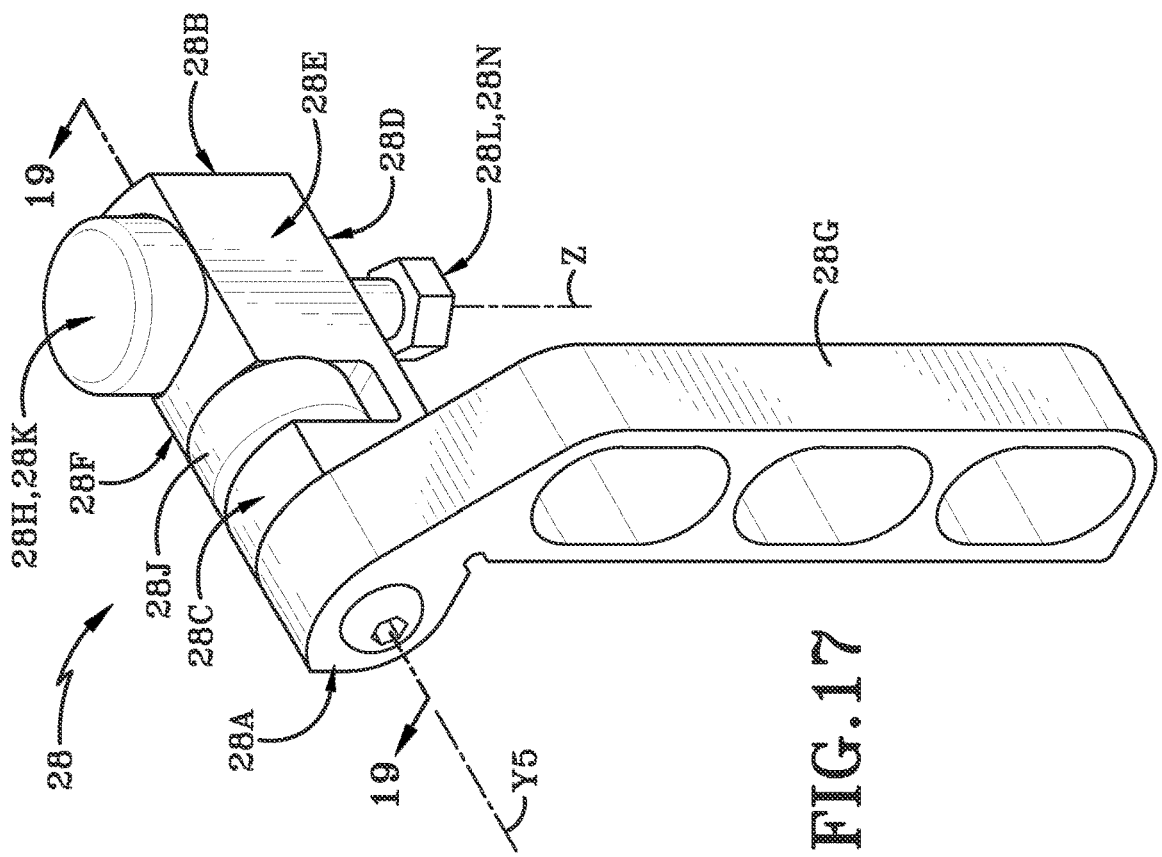
FIG. 17 is a front top left side view of an exemplary flip stop assembly.
Figure 20:
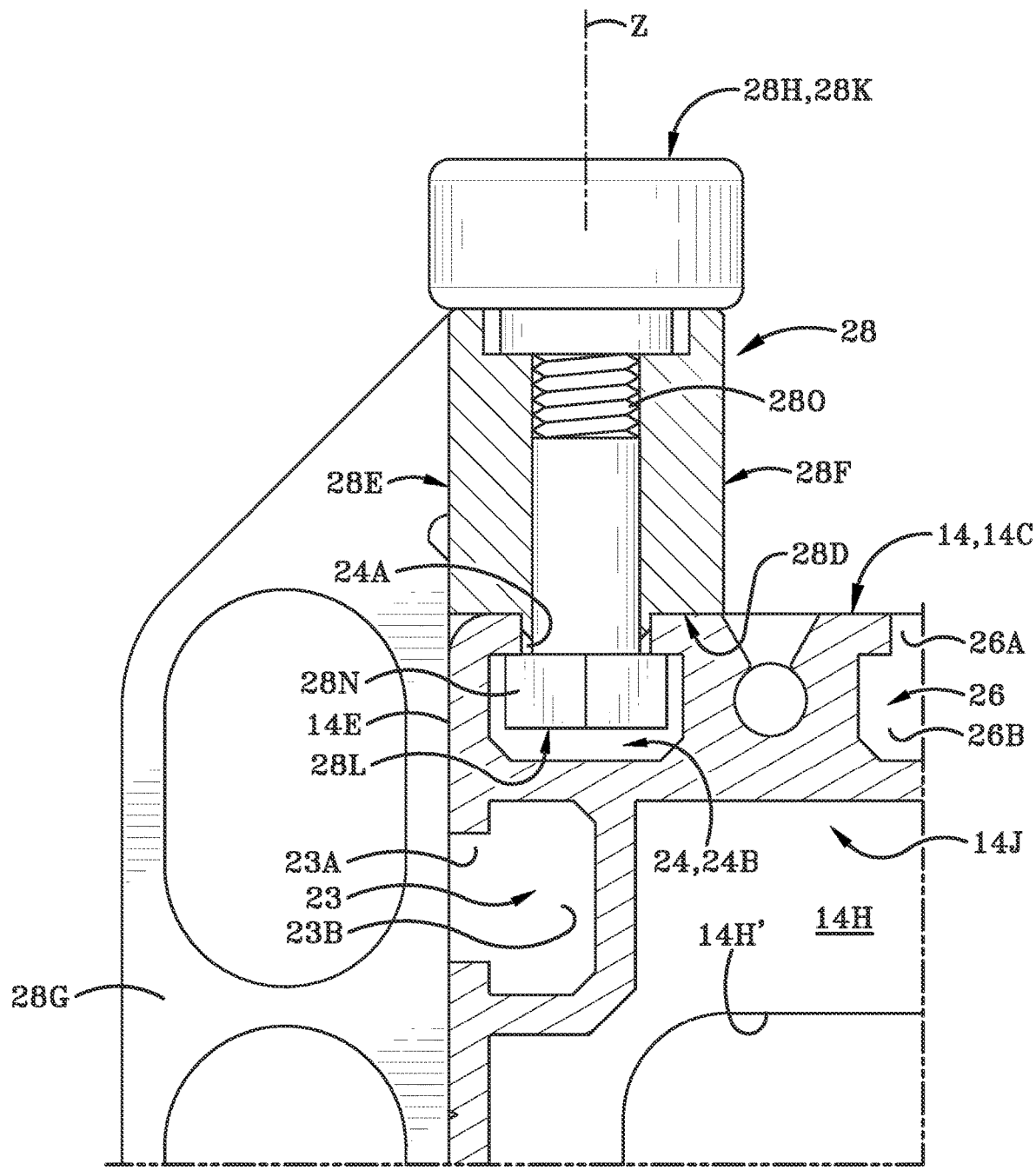
FIG. 20 is a cross sectional view of the exemplary flip stop assembly engaged with a track of the exemplary fence.

With respect to FIG. 19, the cross sectional view of the flip stop 28 along line 19-19 of FIG. 17 is shown. The coarse adjustment mechanism 28H has a first end 28K and a second end 28L Proximate the first end 28K is the adjustment knob 28H with a threaded aperture 28M while proximate the second end 28L is a head 28N and a threaded portion 28O. The threaded apertures 28M is adapted to accept or reject the threaded portion 28O when rotated along the vertical axis Z, as will be discussed with respect to operation. The head 28N is operative to be sized to fit within the bulbous second end 24B, 26B of the channels on the top 14C of the fence 14 but not through narrow first end 23A, 24A, 26A, of the channels as can be seen in FIG. 20.

Further the fine adjustment mechanism 28J is operative to rotate along the longitudinal axis Y5. Within the fine adjustment mechanism 28J is a threaded aperture 28P. This threaded aperture 28P is adapted to accept or reject a threaded portion 28Q when rotated along the longitudinal axis Y5, as will be discussed with respect to operation.

Having thus described an exemplary non-limiting configuration of the system 10, its operation will be discussed with reference to some exemplary features used with the various embodiments.

First, a user may center the drill bit 12A of the drill press 12. The securement post 30 may be loosened from engagement with the slot 14L or otherwise first attached to the slot 14L. The second end 30C may be slid into the central channel 32C of the first track 32 and the central channel 32C of the second track 34. The knob 30B may then be rotated so as to bring the second end 30C in engagement with the top of the bulbous region 32F, 34F of each track 32, 34, respectively. A user may use the aligning aperture 40C to align the bit 12A with the zero value on the indicia 32A, 34A of each track 32, 34 along the Y axis parallel to the longitudinal direction of the fence 14. The sacrificial material 42 is removed, if it is not already, and the aligning aperture 40C is aligned with the drill bit 12A of the drill press 12. This allows the fence 14 to be set at a proper distance so that the indicia 14K on the fence 14 are aligned with a zero value. Therefore, the bit 12A is now aligned at a zero value on both the Y axis running across the table and parallel to the fence 14 as well as the X axis shown running through the center of the aperture 14G of the fence.

Figure 21A:
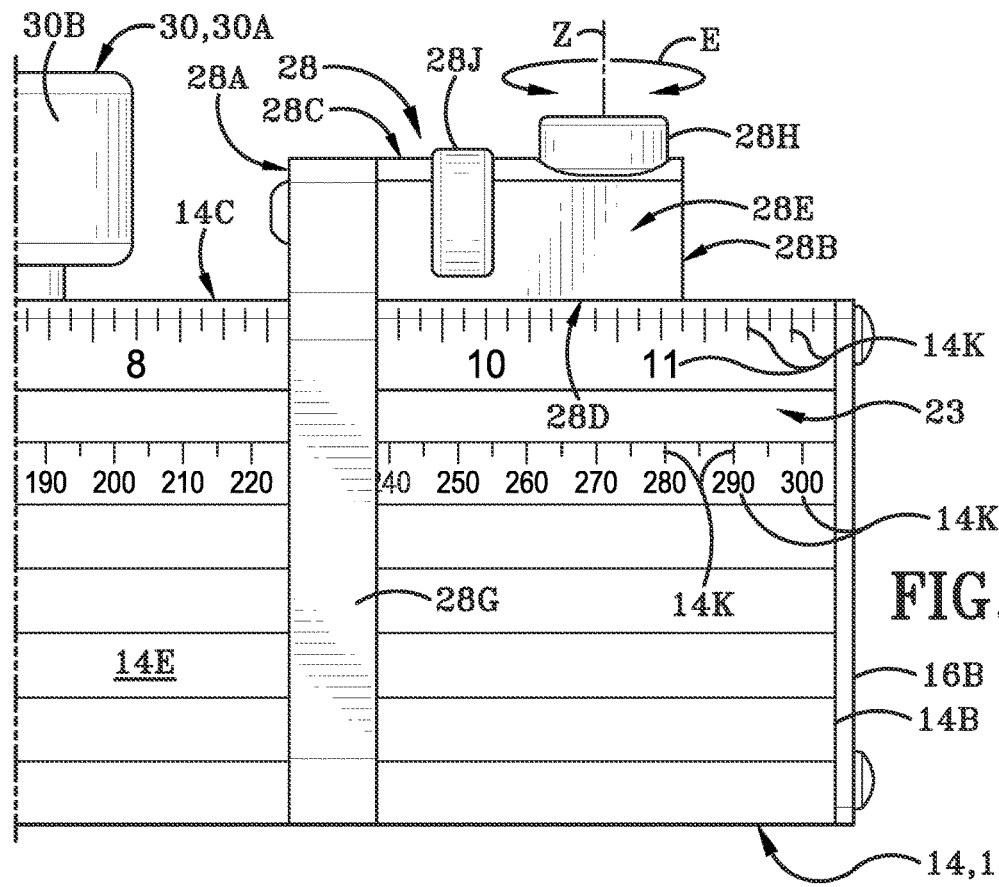
FIG. 21A is a front elevation operational view of the exemplary flip stop assembly engaged with a track of the exemplary fence.
Figure 21B:
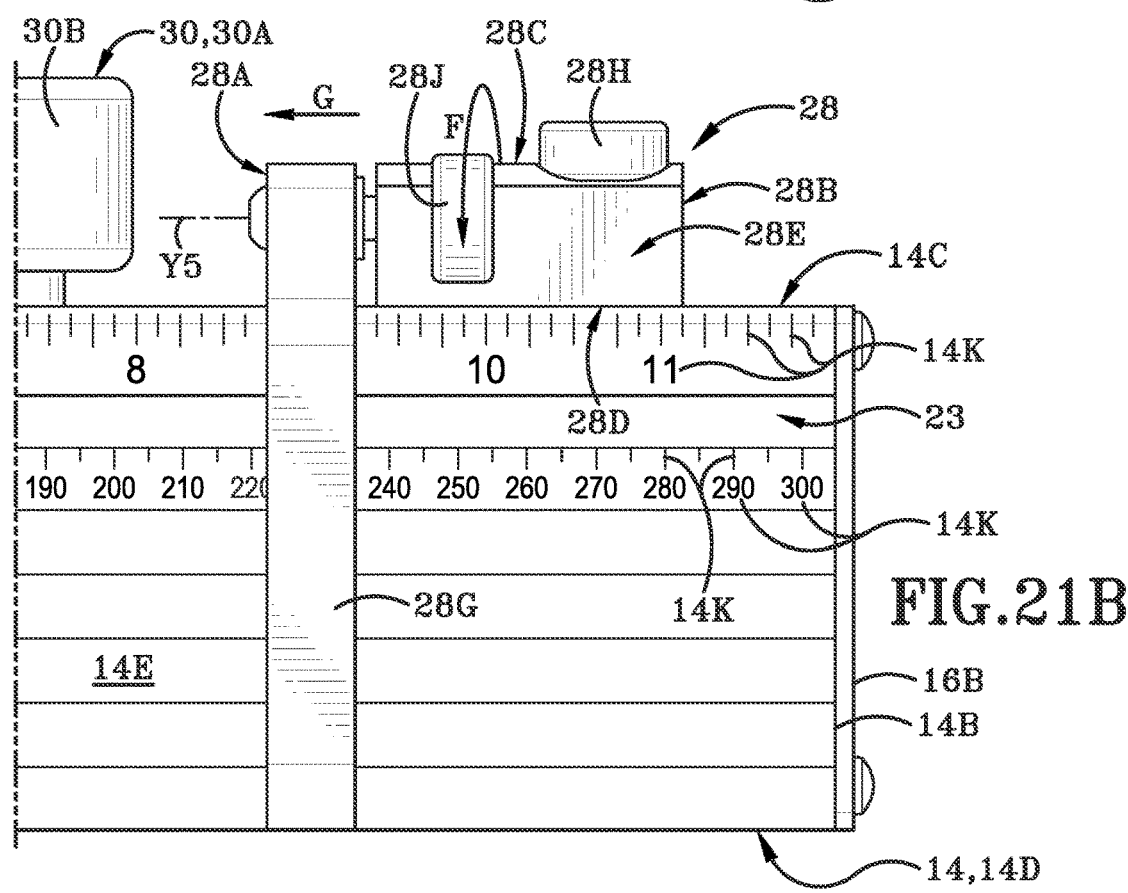
FIG. 21B is a front elevation operational view of the exemplary flip stop assembly engaged with a track of the exemplary fence being adjusted.

Referring specifically to FIG. 21A and FIG. 21B front elevation views of the exemplary flip stop assembly 28 engaged with a track 24 of the exemplary fence 14 is shown. After attaching the fence 14 to the table 18, described above a user may decide to place a flip stop 28 in connection with the channel 24 in order to set a distance, in this instance 9 inches, to modify or cut the material. First, a user may slide the head 28N of the flip stop into the track 24 on the top side 24C of the fence 14.

As seen in FIG. 21A, once the flip stop 28 is near the desired location but prior to reaching the location (9″), a user may rotate the coarse adjustment knob 28H of the flip stop 28 in a first direction about arrow E along. This rotation in a first direction about arrow E secures the bottom side 28D of the flip stop 28 to the top side 14C of the fence 14 through the head 28N being held in engagement with the top of the second end 24B. Alternatively, if the flip stop 28 was already engaged with the fence 14, a user could rotate the coarse adjustment knob 28H in a second direction along arrow E first to loosen the engagement, and then reengage by rotating in a first direction along arrow E.

Referring specifically to FIG. 21B, the flip stop 28 is near its desired location. As a result, the fine adjustment knob 28J may be rotated along arrow F in a first direction about the longitudinal axis Y5. The rotation along arrow F causes the arm mechanism 28G to be propelled along direction G to an exact value indicated by the indicia 14K of the fence 14. This movement along direction G unthreads a portion of the threaded portion 28Q within the threaded aperture 28P extending the distance therebetween. This allows for small fine adjustment when close to the desired distance to insure proper spacing of various cuts.

Referring to FIG. 22 the securement post 30 may be loosened from engagement with the slot 14L or otherwise first attached to the slot 14L. The second end 30C may be slid into the central channel 32C of the first track 32 and the central channel 32C of the second track 34. The knob 30B may then be rotated so as to bring the second end 30C in engagement with the top of the bulbous region 32F, 34F of each track 32, 34, respectively. This allows the fence 14 to be set at a desired distance so that the indicia 14K on the fence 14 are aligned with the chosen desired value. This allows adjustment along the X axis shown running through the center of the aperture 14G of the fence.

Referring generally to FIGS. 23A-23D, specific operational views are shown in conjunction with the system 10. Specifically referring to FIG. 23A, a board or material 62 is abutted against the first side 14E of the fence 14 and in contact with the top side 18C of the table 18. The board 62 has a body with a first end 62A, a second end 62B longitudinally disposed to the first end 62A. The board 62 further includes a top side 62C, a bottom side 62D vertically opposed from the top side 62C. Additionally, the board 62 has a first side 62E and a second side 62F transversely opposed from the first side.

This board 62 is further abutted along arrow H against the arm mechanism 28G of the flip stop 28 at a second end 62B. As a result of the alignment with the flip stop 28 and the indicia 32D, 34D of the tracks a first target 62G of the board 62 has been obtained. This first target 62G of the board 62 is a distance away from a side 62F of the board 62 as indicated by the indicia 32D, 34D located on the tracks, and away from a side 62B as indicated by the location of the arm mechanism 28G of the flip stop 28.

Figure 23A:
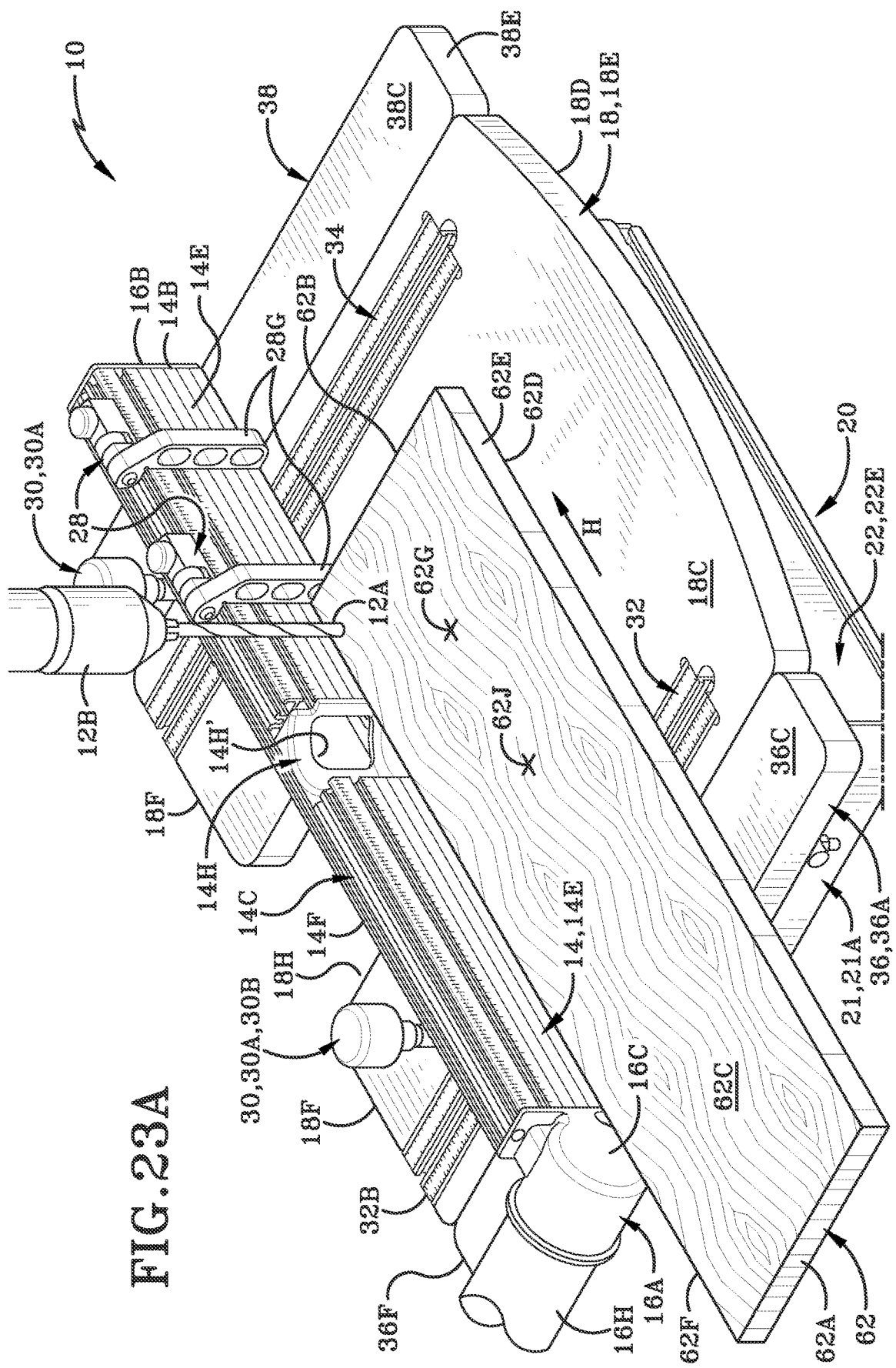
FIG. 23A is a front top left side isometric perspective operational view of the exemplary installed fence and the exemplary table.
Figure 23B:
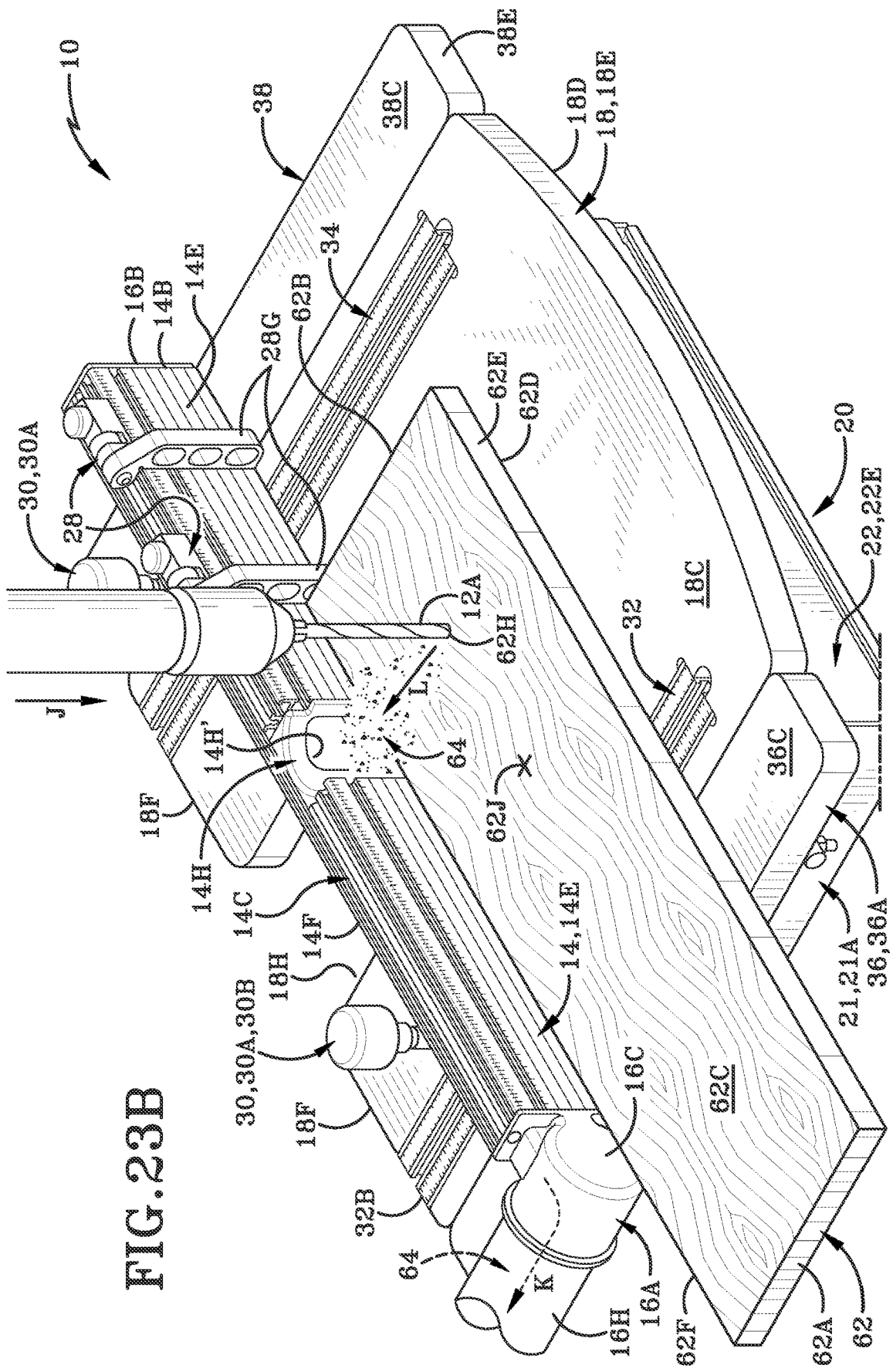
FIG. 23B is a further front top left side isometric perspective operational view of the exemplary installed fence and the exemplary table with a vacuum active.

Now, referring specifically to FIG. 23B, the bit 12A of the drill press 12 has begun to contact the top surface 62C of the board 62. The bit 12A approaches the board 62 from a direction J. As this is done, the vacuum assembly 16 may be turned on to supply suction or negative pressure. The suction moves along direction K. When the board 62 is contacted by the bit 12A, debris or chaff 64 is generated at the point of contact. As a result of the suction, the aperture 14G with the chuck fitting 14H and opening 14H' are operative to capture the chaff 64 and begin to remove the chaff 64 about arrow L. The chaff 64 will travel through the hollow interior 14J of the fence 14 and leave a clean work surface. From the hollow interior 14J the chaff 64 will continue along to the vacuum port 16A along arrow K until contacting the hose 16H that may feed from the open end 16D to a vacuum assembly 16 or other receptacle.

Continuing to FIG. 23C, the first target 62G has been turned into an aperture 62H as a result of the drill bit 12A contacting the board 62. The drill bit 12A may then be removed from contact with the board 62 about arrow M. Then, a flip stop 28 at the arm mechanism 28G may rotate about its longitudinal axis Y5 so as to flip about arrow N. This flip about arrow N removes the board 62 from contacting the arm mechanism 28G. A second target 62J has been located on the board 62 and is a distance away from a side 62F of the board 62 as indicated by the indicia 32D, 34D located on the tracks, and away from a side 62B as indicated by the location of the arm mechanism 28G of the second flip stop 28.

Figure 23D:
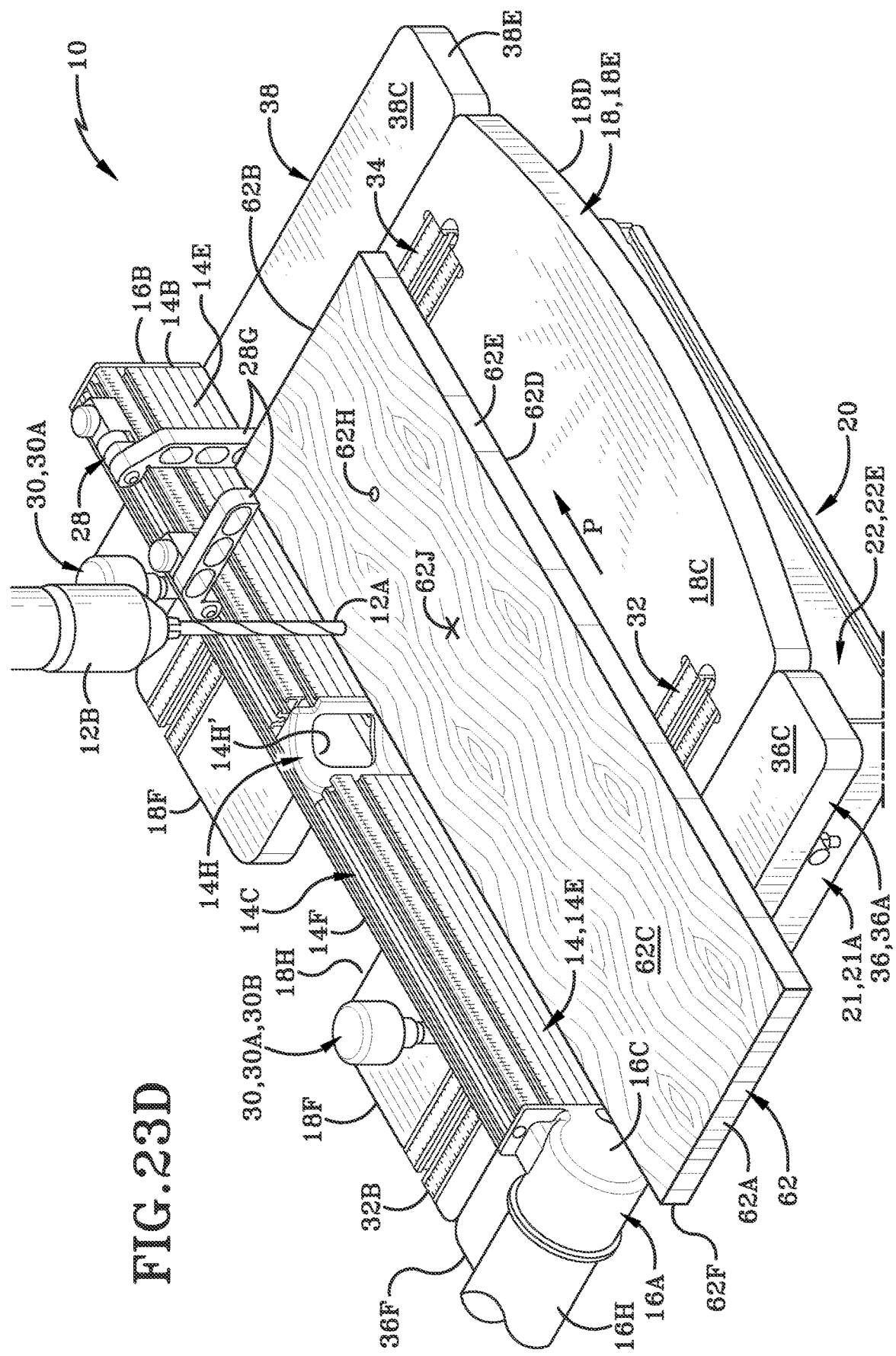
FIG. 23D is a further front top left side isometric perspective operational view of the exemplary installed fence and the exemplary table moving a workpiece to a further location.

As is seen in FIG. 23D, the board 62 is slid about arrow P until the second end 62B contacts the arm mechanism 28G of the second flip slop 28. The board 28 may then be manipulated in a way much like creating the first aperture 62H of the board. This process may be repeated with additional settings of flip stops 28 or additional targets located on the boards. The target may move along the top surface 62C of the board 62 depending on the location of the fence 14 along the tracks 32, 34 or locations of the flip stops 28 along the first side 14E of the fence.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:
1. A machine tool table comprising:
a table with a top surface;

a fence selectively engageable with the table, said fence being rectangular in cross section and including:
a top and a bottom opposed to the top;
a first side and a second side extending between the top and the bottom, wherein the second side is opposed to the first side;
a first end and a second end extending between the first side and the second side, wherein the second end is opposed to the first end;
a hollow interior bounded and defined by the top, the bottom, the first side, the second side, the first end, and the second end of the fence;
a first opening to the hollow interior defined in the fence;
a second opening to the hollow interior defined in the fence remote from the first opening;
a vacuum port operatively engaged with the fence proximate the second opening, wherein the vacuum port is adapted to be connected to a remote vacuum assembly;
wherein the hollow interior of the fence is adapted to receive dust and debris from the top surface of the table via the first opening; and
wherein the vacuum port is adapted to receive the dust and debris from the hollow interior via the second opening and to direct the dust and debris to the remote vacuum assembly.

2. A machine tool table comprising:
a table with a top surface;
a fence selectively engageable with the table, said fence having a body which is rectangular in cross section;
a hollow interior bounded and defined by the body;
a first opening defined in the body;
a second opening defined in the body remote from the first opening, wherein each of the first opening and the second opening is in fluid communication with the hollow interior;
a vacuum port operatively engaged with the body proximate the second opening, wherein the vacuum port is adapted to be connected to a remote vacuum assembly;
wherein the hollow interior of the body is adapted to receive dust and debris from the top surface of the table via the first opening;
wherein the vacuum port is adapted to receive the dust and debris from the hollow interior via the second opening and to direct the dust and debris to the remote vacuum assembly,
wherein the body of the fence includes:
a top and a bottom opposed to the top;
a first side and a second side extending between the top and the bottom, wherein the second side is opposed to the first side;
a first end and a second end extending between the first side and the second side, wherein the second end is opposed to the first end;
wherein the hollow interior is bounded and defined by the top, the bottom, the first side, the second side, the first end, and the second end of the body;
wherein the first opening is defined partially in the top and first side of the body; and
wherein the second opening is defined in the first end of the body.

3. The machine tool table of claim 2, further comprising:
a flip stop assembly comprising:
a stop;
an arm mechanism connection to the stop;
a coarse adjustment mechanism for adjusting the stop; and
a fine adjustment mechanism for adjusting the stop.

4. The machine tool table of claim 3, wherein the fine adjustment mechanism is rotatable about a longitudinal axis.

5. The machine tool table of claim 3, further comprising:
at least one channel along a top side of the fence.

6. The machine tool table of claim 5, wherein the flip stop assembly engages the fence and is operative to be connected to the fence along the at least one channel.

7. The machine tool table of claim 5, in which the first opening extends at least partially into the at least on channel.

8. The machine tool table of claim 2, further comprising:
the table having a bottom surface;
a drawer positioned below the bottom surface of the table.

9. The machine tool table of claim 2, further comprising:
at least one extension attached to the table to extend a workable area of the table.

10. The machine tool table of claim 9, further comprising:
a plurality of extension arms, wherein the at least one extension is attached to the table via the plurality of extension arms.

11. The machine tool table of claim 10, wherein each extension arm of the plurality of extension arms extends along an independent longitudinal axis.

12. The machine tool table of claim 11, in which the plurality of extension arms is positioned below the table.

13. The machine tool table of claim 12, further comprising:
a drawer; and the plurality of extension arms is positioned above the drawer.

14. The machine tool table of claim 13, in which the plurality of extension arms move adjacent the table.

15. The machine tool table of claim 2, further comprising:
indicia located on the fence to indicate that a drill bit connected to a drill press is properly indexed to a known value along a longitudinal axis.

16. The machine tool table of claim 15, further comprising:
a first track located within a first aperture of the table; said first track having a first central channel;
a second track located within a second aperture of the table, said second track having a second central channel; and
wherein each of the first track and the second track has a first set of aligning indicia operative to indicate transverse location of the fence.

17. The machine tool table of claim 16, further comprising:
a securement post adapted to secure the fence to the table and align the fence along a transverse axis.

18. The machine tool table of claim 2, wherein the first opening is in fluid communication with the hollow interior of the body of the fence.

19. The machine tool table of claim 18, wherein the first opening is configured to receive a portion of a drill bit and a chuck when in use.

20. The machine tool table of claim 19, in which the first opening is arcuate in shape.

21. A machine tool table comprising:
a table with a top surface;
a fence having a hollow body defining a through aperture with a first opening and a second opening;
wherein the first opening is adapted to receive dust therein and the second opening is adapted to connect to a vacuum assembly;
an end plate located in a side of the fence opposite the second opening; and
wherein the end plate is removable to create a third opening.

22. The machine tool table of claim 21, wherein the first opening extends at least in part into a front side of the fence and a top surface of the fence.

* * * * *